United States Patent
Aoki et al.

(10) Patent No.: US 7,814,504 B2
(45) Date of Patent: Oct. 12, 2010

(54) DISC PLAYER APPARATUS WITH UPPER AND LOWER ROLLERS FOR TRANSPORTING AND GUIDING A DISC

(75) Inventors: Shinichi Aoki, Tottori (JP); Yoichi Zenimoto, Tohaku-gun (JP); Toru Matsuoka, Tattori (JP)

(73) Assignees: Sanyo Electric Co., Ltd., Moriguchi-shi (JP); Tottori Sanyo Electric Co., Ltd., Tottori-shi (JP)

( * ) Notice: Subject to any disclaimer, the term of this patent is extended or adjusted under 35 U.S.C. 154(b) by 870 days.

(21) Appl. No.: 11/574,832

(22) PCT Filed: Sep. 5, 2005

(86) PCT No.: PCT/JP2005/016258

§ 371 (c)(1),
(2), (4) Date: Mar. 7, 2007

(87) PCT Pub. No.: WO2006/028056

PCT Pub. Date: Mar. 16, 2006

(65) Prior Publication Data

US 2007/0258347 A1 Nov. 8, 2007

(30) Foreign Application Priority Data

| Sep. 7, 2004 | (JP) | 2004-259358 |
| Sep. 7, 2004 | (JP) | 2004-259359 |
| Sep. 7, 2004 | (JP) | 2004-259360 |
| Sep. 7, 2004 | (JP) | 2004-259361 |

(51) Int. Cl.
*G11B 17/04* (2006.01)
(52) U.S. Cl. .................. 720/624; 720/642
(58) Field of Classification Search ............ 720/624, 720/625, 642
See application file for complete search history.

(56) References Cited

U.S. PATENT DOCUMENTS 4,507,768 A * 3/1985 Ikedo et al. ............. 720/624

(Continued)

FOREIGN PATENT DOCUMENTS

EP 0920002 A2 6/1999

(Continued)

OTHER PUBLICATIONS

International Search Report of PCT/JP2005/016258, date of mailing Dec. 13, 2005.

(Continued)

*Primary Examiner*—Brian E Miller
(74) *Attorney, Agent, or Firm*—Westerman, Hattori, Daniels & Adrian, LLP

(57) ABSTRACT

There is provided a disc player apparatus capable of transporting a disc (11) by holding the disc (11) between a lower roller (70) and an upper roller (80). The lower roller (70) and the upper roller (80) are rockably supported with respect to a main body (20*a*). A flat spring (210) which urges the upper roller (80) is attached to an upper case (200*a*) that is attached to the main body (20*a*). The urge of the flat spring (210) is applied via a roller support member (810) which supports the upper roller (80). The pressure is applied evenly to the upper roller (80), enabling to reduce diagonal travel of the disc for example, and to transport the disc smoothly.

4 Claims, 20 Drawing Sheets

U.S. PATENT DOCUMENTS

| | | | |
|---|---|---|---|
| 4,592,039 A * | 5/1986 | Toyoguchi et al. | 720/624 |
| 5,574,711 A | 11/1996 | Nakamichi | |
| 5,615,184 A | 3/1997 | Tsuruta et al. | |
| 5,862,012 A * | 1/1999 | Tsuchiya | 360/99.02 |
| 5,872,756 A | 2/1999 | Shime | |
| 6,185,164 B1 * | 2/2001 | Takemasa et al. | 369/30.31 |
| 6,574,185 B2 * | 6/2003 | Nakatani et al. | 720/624 |
| 6,978,467 B1 * | 12/2005 | Fukushima et al. | 720/624 |
| 7,134,127 B2 * | 11/2006 | Aoki et al. | 720/619 |
| 2005/0050565 A1 * | 3/2005 | Yoshimura | 720/624 |

FOREIGN PATENT DOCUMENTS

| | | |
|---|---|---|
| EP | 1100083 A2 | 5/2001 |
| JP | 62-69897 | 5/1987 |
| JP | 62-69897 U | 5/1987 |
| JP | 64-18454 U | 1/1989 |
| JP | 06-119702 | 4/1994 |
| JP | 7-141743 A | 6/1995 |
| JP | 9-7263 A | 1/1997 |
| JP | 09-007263 A | 1/1997 |
| JP | 2001-331997 A | 11/2001 |
| JP | 2002-74800 | 3/2002 |
| JP | 2002-74800 A | 3/2002 |
| JP | 2003-141800 A | 5/2003 |
| JP | 2004-055042 | 2/2004 |

OTHER PUBLICATIONS

Translation of the International Preliminary Report on Patentability of International Application No. PCT/JP 2005/016258, with Form PCT/IB/373 and Form PCT/ISA/237.

European Search Report dated Sep. 24, 2009, issued in corresponding European Patent Application No. 05776995.2.

* cited by examiner

DISC PLAYER APPARATUS WITH UPPER AND LOWER ROLLERS FOR TRANSPORTING AND GUIDING A DISC

TECHNICAL FIELD

The present invention relates to disc player apparatuses which replay from and/or record to discs such as CD (Compact Disc) and DVD (Digital Versatile Disc).

BACKGROUND ART

Among disc player apparatuses which replay from and/or record to discs such as CD and DVD are those provided with a slot-in type disc transporting mechanism in which the disc is transported between a disc transporting roller and a disc guide roller by rotating movement of the transporting roller. The slot-in type disc player apparatuses are used popularly in car audio systems, etc.

Slot-in type disc player apparatuses include: a disc replay unit provided with a turntable and an optical pickup; a disc loading mechanism provided with loading rollers for moving the disc in and out of the disc player, a disc clamping mechanism for placing the disc onto the turntable; and so on, assembled in a case.

In these slot-in type disc player apparatuses, when the disc is moved to a predetermined position in the disc player apparatus, a drive mechanism which drives the transporting roller is disengaged, and the transporting roller no longer is pressed onto the guide roller which guides the disc.

After the pressing state is terminated, a playing unit is unlocked, upon which an end of the loading operation is detected. Thus, the loading operation comes to an end and the playing operation of the disc is started.

When the disc is unloaded and then transported in the slot-in type player apparatus described above, clamping on the disc is released by moving a clamper off the turntable and the disc is sandwiched thereafter between the transporting roller and the guide roller (See Patent Document 1 for example).

In the slot-in type player apparatus described above, arrangements are employed so that the disc surface is protected from damage.

As an example of the arrangements to protect the disc from damage, there is a proposal for a method of eliminating slippage between the disc and the rollers by shifting a drive-power transmission mechanism to stop the rollers immediately, thereby preventing the rollers from idle rotation (see Patent Document 2 for example).

In the conventional slot-in type player apparatus described above, an urging spring such as a coil spring is provided at an end of the roller shaft to urge the roller toward the disc in order to ensure that there is a predetermined friction torque between the roller and the roller shaft.

Conventionally, however, the urging spring requires a burdensome step to assemble, and depending on the way it is assembled, the spring does not provide the predetermined torque.

Meanwhile, in conventional slot-in type player apparatuses, there has been a requirement for a reduced thickness of the apparatus, and due to the requirement, parts and components have increasingly been placed closely to each other than ever before.

This has created a problem that during a disc ejecting operation after the turntable and the clamper are separated from each other, part of the disc hits a clamper arm which supports the clamper before the disc is sandwiched between the transporting roller and the guide roller, making an uncomfortable impact noise for example.

Disc player apparatuses for installation in automobiles have a special arrangement to avoid jumping during replay operation; specifically, the case and the disc replay unit provided therein are made as independent of each other, and the two components are connected with each other by elastic members such as dampers and springs, into a floating state. With such an arrangement as the above, vibrations of the automobile when the automobile is driven is not transmitted from the case, etc. to the disc replay unit provided therein.

These disc player apparatuses are provided with a locking mechanism which locks the disc replay unit to the case thereby establishing a predetermined positional relationship between the disc insertion slot and the disc replay unit when the disc loading mechanism loads/unloads a disc by pressing the rollers onto the disc.

For these disc player apparatuses which are provided with the elastic members such as dampers and springs, proposals have been made for floating lock mechanisms of the disc player apparatus which require a fewer parts and simpler constitution for savings on the manufacturing cost (see Patent Document 3 for example).

For the conventional disc player apparatuses which are provided with the elastic members such as dampers and springs, proposals have been made for ways to simplify the floating lock mechanism. However, no consideration has been disclosed so far on the method for mounting the dampers on the case. A poor positioning of the dampers on the case will cause the dampers to fall off.

[Patent Document 1] JP-A 2002-74800 Gazette
[Patent Document 2] JP-A 2003-141800 Gazette
[Patent Document 3] JP-A 2001-331997 Gazette

DISCLOSURE OF THE INVENTION

Problems to be Solved by the Invention

A first object of the present invention is to provide a slot-in type disc player apparatus which is easy to assemble yet capable of giving a predetermined friction torque between the roller and the roller shaft.

A second object of the present invention is to eliminate the impact noise at the time of ejection in the slot-in type disc player apparatus.

A third object of the present invention is to provide a slot-in type disc player apparatus capable of ejecting the disc smoothly at the time of ejection.

A fourth object of the present invention is to provide a slot-in type player apparatus which allows easy and reliable assembly of the dampers.

Means for Solving the Problems

The present invention provides a disc player apparatus which includes a transporting roller and a disc guide roller for transportation and ejection of a disc by holding the disc therebetween and rotating the transporting roller. The disc player apparatus further includes: first supporting means for supporting the transporting roller rockably with respect to a main body; second supporting means for supporting the disc guide roller rockably with respect to the main body; a guide member for engagement with the first supporting member to move the transporting roller toward the disc when transporting and ejecting the disc and to move the transporting roller to a turnabout position when recording on or replaying from the disc; a guide member for contact with the second supporting member to move the disc guide roller toward the disc when transporting and ejecting the disc and to move the disc guide roller to a turnabout position when recording on or replaying from the disc; an upper case attached to the main body; and a flat spring attached to the upper case for urging the disc guide roller.

As described, according to the present invention, a flat spring of a predetermined shape is fixed to an upper case in advance and by attaching the upper case to the main body, a predetermined amount of pressure is easily applied to the disc guide roller (upper roller).

Preferably, the disc guide roller is urged by the flat spring via the second supporting means.

As described, by applying the pressure from the flat spring via the support member to the disc guide roller, the disc guide roller is pressed more evenly than incases where the disc guide roller is urged directly by a coil spring for example, and the disc receives more uniform pressure along its lateral directions. This reduces such problems as the disc traveling diagonally, and leads to smooth transport of the disc.

Further, preferably, the flat spring is provided with a spring piece for contact with the disc guide roller at a disc guide roller turnabout position.

As described, a flat spring which makes contact with the disc guide roller when the disc guide roller comes off the disc reduces vibration of the disc guide roller during recording/replaying of the disc.

Also preferably, the disc player apparatus further includes driving means for driving the transporting roller, and controlling means for controlling the driving means; and the controlling means controls the driving means in such a way that the transporting roller is rotated in a disc ejecting direction for a predetermined time after the disc is held between the transporting roller and the disc guide roller, then rotated in a disc transporting direction for a predetermined time, and then rotated in the disc ejecting direction, when the disc is ejected.

As described, by controlling the drive means in such a way that the transporting roller is turned in the ejecting direction, then in the loading direction, and then again in the ejecting direction, it becomes possible to prevent troubles such as the disc being caught on e.g. the turntable, the clamper, etc. in the apparatus and becoming unable to eject.

Further, preferably, the controlling means controls the driving means in such a way that rotation of the transporting roller is stopped for a predetermined time when direction of rotation of the transporting roller is switched from the disc ejecting direction to the disc transporting direction or from the disc transporting direction to the disc ejecting direction.

As described, by stopping the drive means for a predetermined time, each of the gears in the apparatus is protected from being subjected to an excessive force in a sudden change in rotating directions.

Further, the present invention provides a disc player apparatus including a transporting roller and a disc guide roller for transportation and ejection of a disc by holding the disc therebetween and rotating the transporting roller. The disc player apparatus further includes: a main body; an upper case provided above the main body; a lower case provided below the main body; a turntable provided in the main body for rotating a disc; a clamper provided contactably with the turntable; a clamper arm pivotably attached to the main body for rotatably supporting the clamper; and a buffer member attached to the clamper arm for contact with the upper case. The buffer member prevents the clamper arm from hitting the upper case.

Further, preferably, the buffer member has at least a tip portion made of a spring material.

As described, according to the present invention, a buffer member for softening impact is provided on the clamper arm, and by allowing the tip of the buffer member to make contact with the disc at the time of ejection, an impact between the disc and the clamper at the time of ejection is softened, eliminating chances for noises.

Further, the present invention provides a disc player apparatus including a transporting roller and a disc guide roller for transportation and ejection of a disc by holding the disc therebetween and rotating the transporting roller. The disc player apparatus further includes: driving means for driving the transporting roller; and controlling means for controlling the driving means. The controlling means controls the driving means in such a way that the transporting roller is rotated in a disc ejecting direction for a predetermined time after the disc is held between the transporting roller and the disc guide roller, then rotated in a disc transporting direction for a predetermined time, and then rotated in the disc ejecting direction, when the disc is ejected.

As described, by controlling the drive means in such a way that the transporting roller is turned in the ejecting direction, then in the loading direction, and then again in the ejecting direction, it becomes possible to prevent troubles such as the disc being caught on e.g. the turntable, the clamper, etc. in the apparatus and becoming unable to eject.

Further, preferably, the controlling means controls the driving means in such a way that rotation of the transporting roller is stopped for a predetermined time when direction of rotation of the transporting roller is switched from the disc ejecting direction to the disc transporting direction or from the disc transporting direction to the disc ejecting direction.

As described, by stopping the drive means for a predetermined time, each of the gears in the apparatus is protected from being subjected to an excessive force in a sudden change in rotating directions.

Further, the present invention provides a disc player apparatus which elastically supports a floating chassis including a disc replay unit by a plurality of dampers in a player main body. The main body comprises an upper case attached to an upper portion of the main body and a lower case attached to a lower portion of the main body. Each damper has an outer frame attached to the main body. The lower case is provided with engagement portions for engagement with the outer frame portion of the damper, and the outer frame of the damper is fitted into the engagement portion.

Further, preferably, the outer frame of the damper is provided with a stepped portion for fitting into the engagement portion.

As described, according to the present invention, the dampers are fixed by the main body and the engagement portions in the lower case, and therefore the damper portion members are securely fixed.

BEST MODE FOR CARRYING OUT THE INVENTION

Hereinafter, an embodiment of the present invention will be described with reference to FIG. 1 through FIG. 24. In the following embodiment, the term front-end side means the side closer to the farthest end of a main body case 20, i.e. the side away from a disc insertion slot 12, whereas the term rear-end side refers to the side closer to the disc insertion slot 12 unless otherwise stated.

Figure 1:
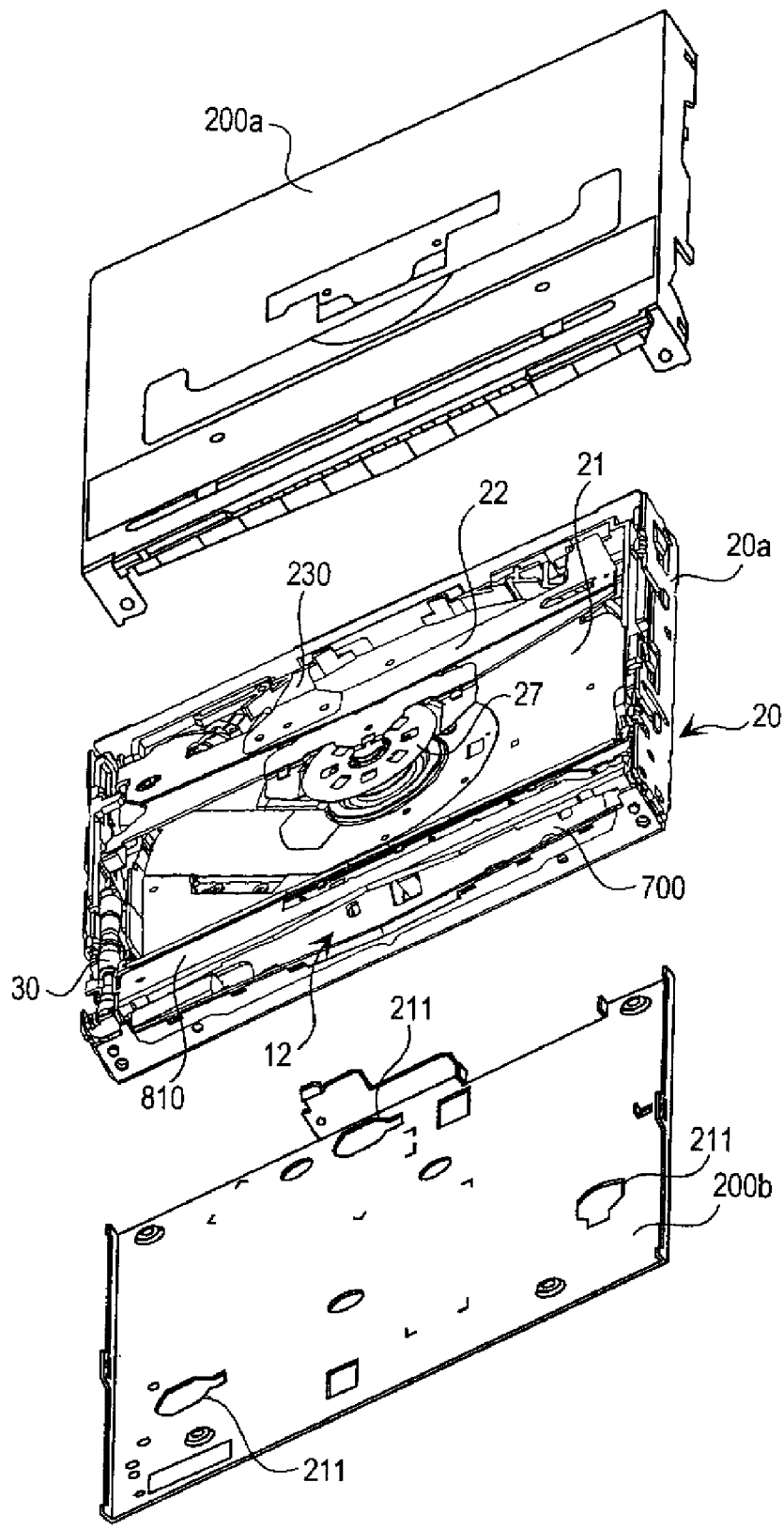
FIG. 1 is an exploded perspective view which shows a construction of a disc player apparatus according to the present invention.

FIG. 1 is an exploded perspective view showing a construction of a disc player apparatus according to the present invention. The disc player apparatus 10 is a player for a disc 11 (FIG. 9, FIG. 10) such as a DVD (Digital Versatile Disc). However, the disc 11 (recording medium) played by the disc player apparatus 10 is not limited to DVD, and may be other recording media such as a CD (Compact Disc).

As shown in FIG. 1, the disc player apparatus includes: a main body case 20 which serves as a casing that houses parts provided therein and a disc 11 when it is inserted; as well as an upper case 200a and a lower case 200b attached to an upper and a lower portions of the main body case 20 respectively. The main body case 20 houses a floating chassis 21 which serves as a chassis.

The floating chassis 21 is elastically supported via dampers with respect to the main body case 20 so as to sink by a predetermined amount with respect to the main body case 20 when the disc 11 is inserted. Though not illustrated, the floating chassis 21 is mounted with: a printed circuit board including ICs such as a microcomputer for controlling the apparatus, performing signal processing and so on; and an optical pickup which is movable radially of the disc for making access to the disc.

Figure 2:
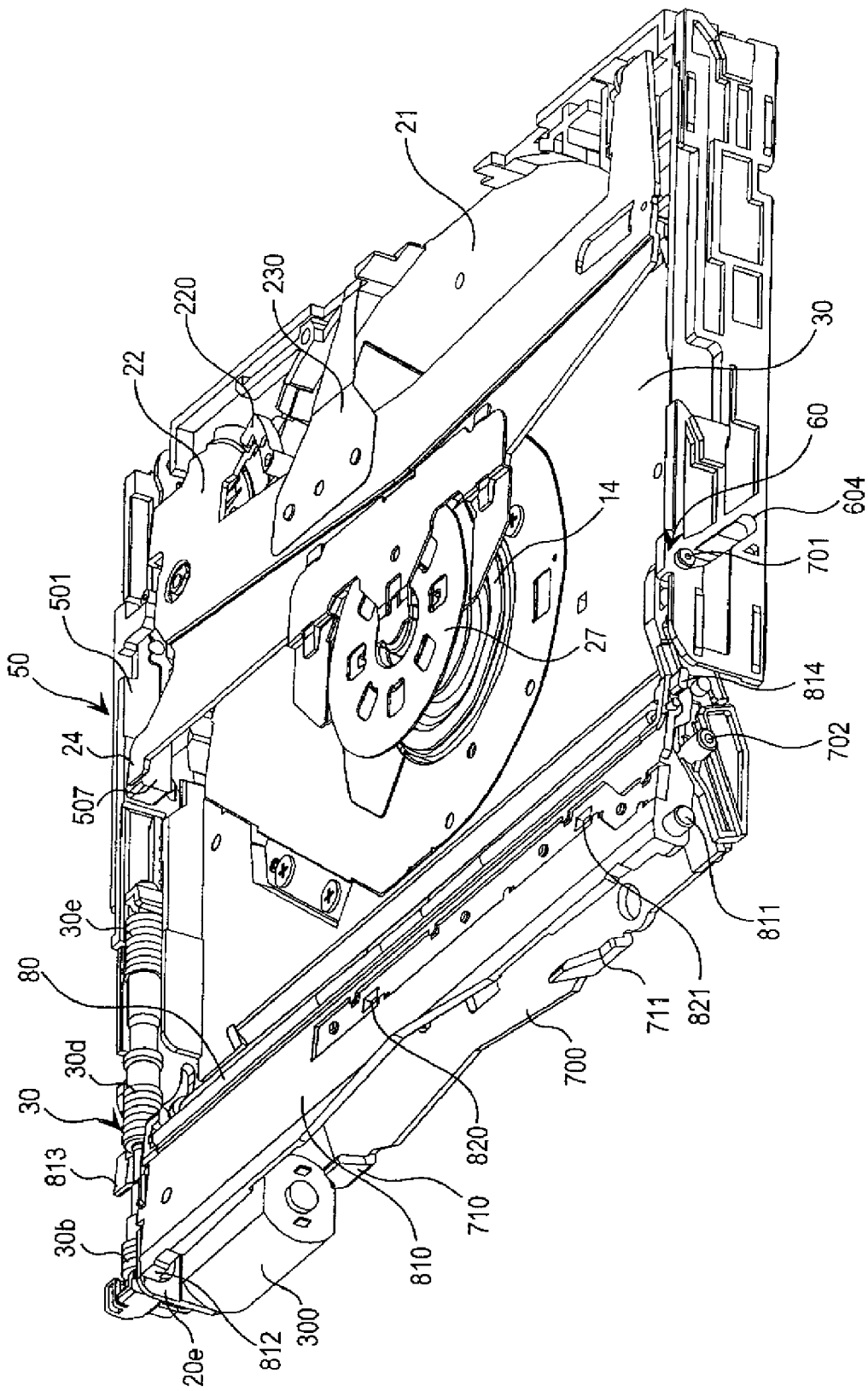
FIG. 2 is a perspective view which shows a main body case portion under a standby state for insertion of a disc in the disc player apparatus according to the present invention.
Figure 3:
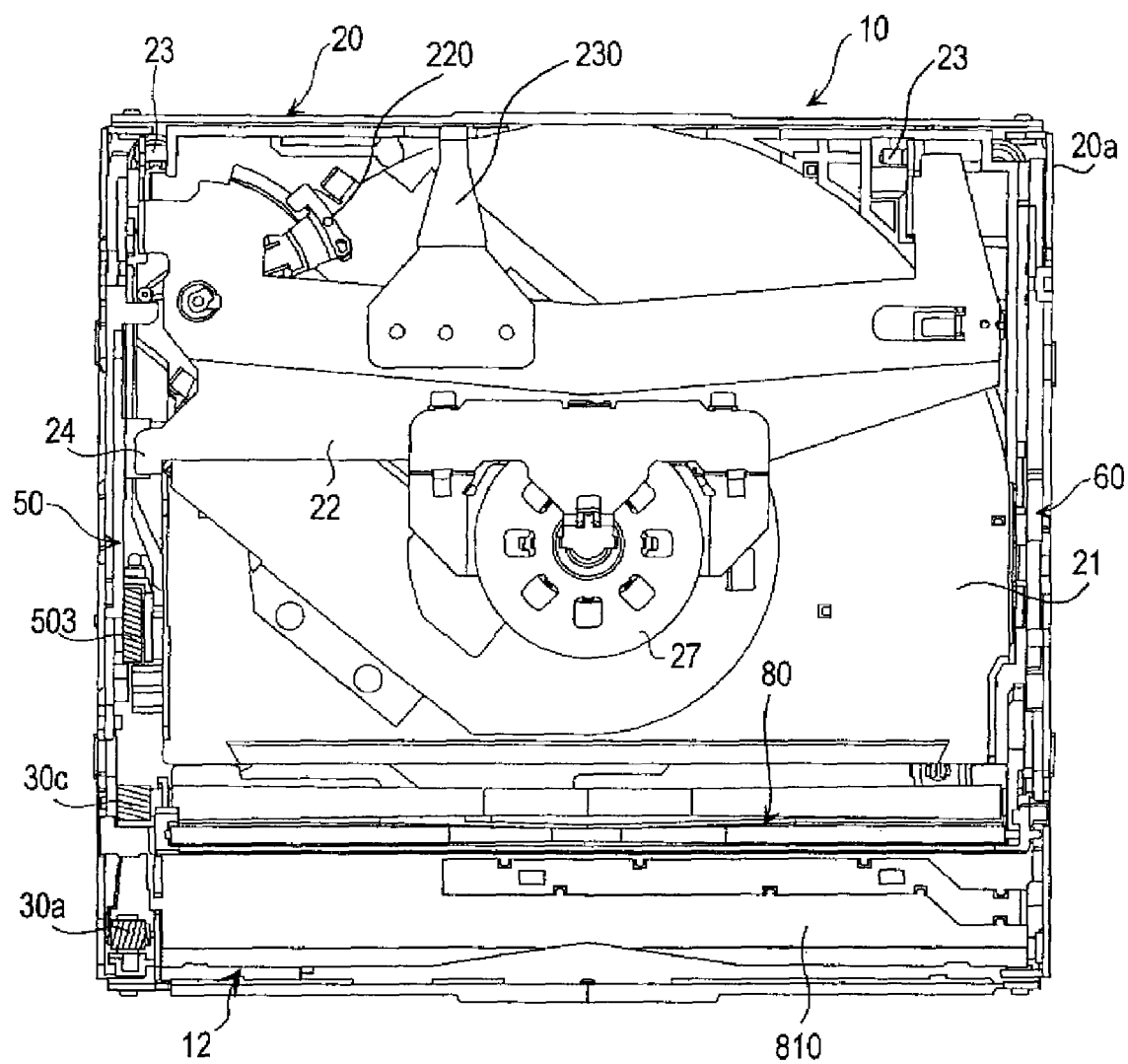
FIG. 3 is a plan view which shows the main body case portion under the standby state for insertion of a disc in the disc player apparatus according to the present invention.
Figure 4:
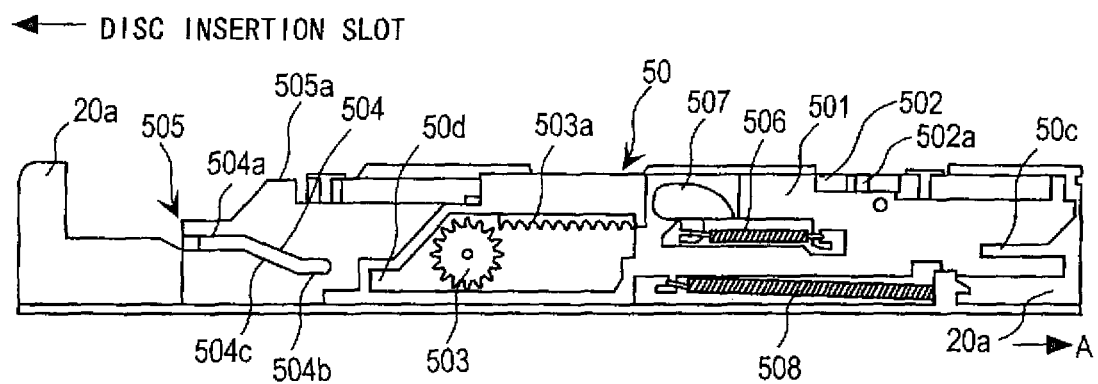
FIG. 4 is a side view which shows a first slider portion under the standby state for insertion of a disc in the disc player apparatus according to the present invention.
Figure 5:
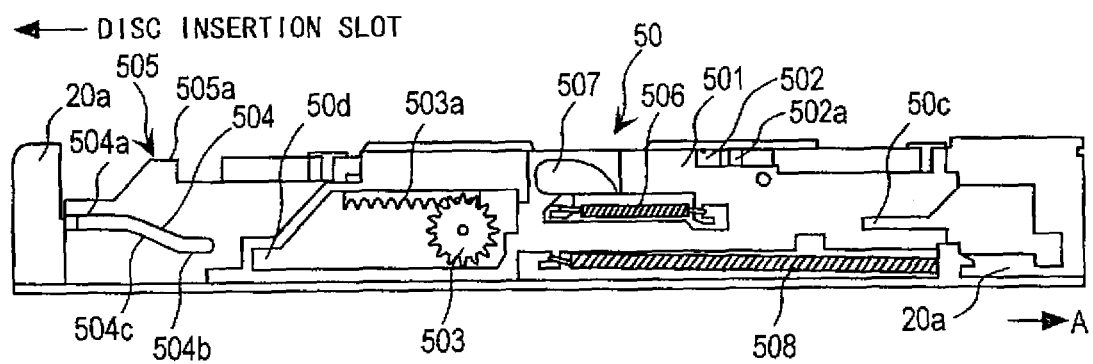
FIG. 5 is a side view which shows the first slider portion under a recording/replaying state of a disc in the disc player apparatus according to the present invention.
Figure 6:
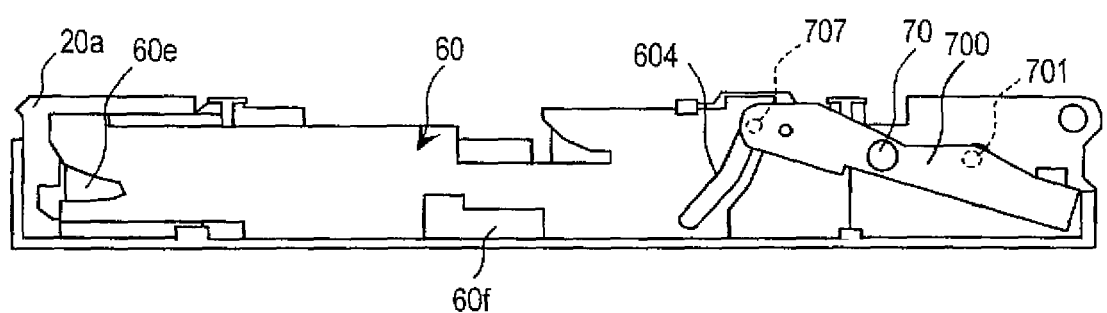
FIG. 6 is a side view which shows a second slider portion under the standby state for insertion of a disc in the disc player apparatus according to the present invention.
Figure 7:
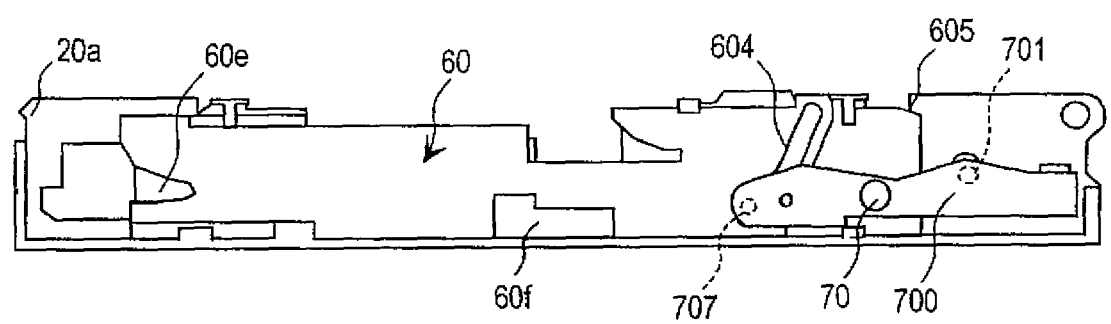
FIG. 7 is a side view which shows the second slider portion under the recording/replaying state of a disc in the disc player apparatus according to the present invention.
Figure 8:
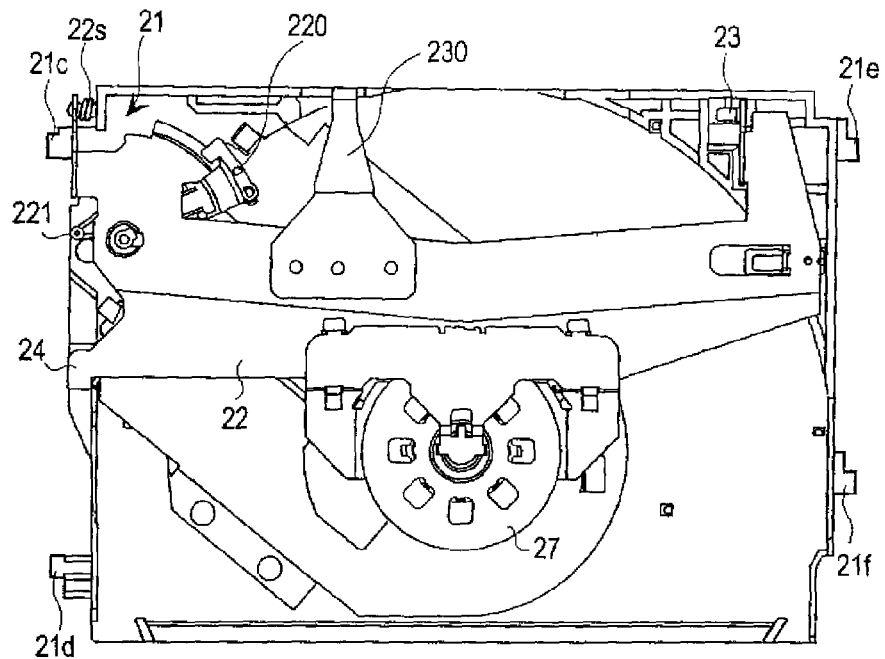
FIG. 8 is a plan view which shows a floating chassis portion in the disc player apparatus according to the present invention.

FIG. 2 is a perspective view which shows a main body case portion under a standby state for insertion of a disc. Part of the main body case is unillustrated to provide a clear view of relevant parts. FIG. 3 is a plan view which shows the main body case portion under the standby state for insertion of a disc. FIG. 4 is a side view which shows a first slider portion under the standby state for insertion of a disc. FIG. 5 is a side view which shows the first slider portion under a recording/replaying state of a disc. FIG. 6 is a side view which shows a second slider portion under the standby state for insertion of a disc. FIG. 7 is a side view which shows the second slider portion under the recording/replaying state of a disc. FIG. 8 is a plan view which shows a floating chassis portion.

As shown in these figures, the floating chassis 21 is provided along an inner side wall of a chassis main body 20a of the main body case 20. The floating chassis 21 has two lateral sides which are parallel to the direction in which the disc 11 is inserted. These sides and the chassis main body 20a of the main body case 20 provide spaces for a first slider 50, a second slider 60, etc. shown in FIG. 3, FIG. 4, FIG. 5, FIG. 6 and FIG. 7.

As shown in FIG. 2 and FIG. 3, the floating chassis 21 pivotably supports a clamper arm 22 via pivot fulcrums 23. In order to secure the clamper arm 22 on the pivot fulcrums 23, holes are provided in the clamper arm 22 so as to be fitted by shafts of the pivot fulcrums 23, and the holes are inserted by respective shafts of the pivot fulcrums 23.

The clamper arm 22 is provided with a spring 22s (see FIG. 8), and the clamper arm 22 is urged to pivot toward the turntable 14 around the pivot fulcrums 23.

The clamper arm 22 is also provided with a clamper 27 which is made of a magnetic member for pressing the disc 11 onto the turntable 14. When the clamper 27 is pressed on the turntable 14 which is provided with a magnet, the urge from the spring and the magnetic force from the magnet on the turntable 14 allow the clamper 27 and the turntable 14 to hold the disc 11 on the turntable 14 under a pressure. When the turntable 14 is rotated by a turntable motor (not illustrated) under this state of holding under a pressure, the disc 11 and the clamper 27 which presses the disc 11 are rotated to allow recording/replaying of the disc 11.

The clamper arm 22 has a tab 24. As will be described later, the tab 24 makes contact with a cam 507 which is provided in the first slider 50, at the time of insertion, ejection, etc. of the disc 11, to move the clamper 27 away from the turntable 14 against the urge from the spring 22s.

Further, the clamper arm 22 is provided with a fan-shaped, rockable actuator 220 which makes contact with a disc when the disc is inserted. The actuator 220 has a tip provided with a pin 221 which makes contact with a projection 502a of a rack gear member 502 in the first slider 50, to be described later, when a disc is inserted. Further, though not illustrated, the actuator 220 has a surface which faces the floating chassis 21 and is provided with a projection so that the clamper 27 is held off the disc until the disc arrives at a replay position on the floating chassis 21. With this arrangement, the actuator 220 is pushed by part of the disc until the disc arrives at the replay position, and the actuator 220 rocks as it is pushed away by the disc.

When the disc has arrived at a predetermined position, the clamper 27 which has been held off is freed. For this purpose, the floating chassis 21 has a hole (not illustrated) at a predetermined location for receiving the projection.

At a time of ejection, the cam 507 of the first slider 50 pushes up the tab 24 of the clamper arm 22 in order to move the clamper 27 away from the turntable 14. When the cam 507 begins to rock the clamper arm 22, it is likely that the clamper arm 22 will hit the upper case and makes an impact noise at the time of contact. For this reason, a buffer member 230 which has a tip provided by a flat spring for impact reduction purpose is formed on the clamper arm 22 according to the present embodiment. The tip portion of the buffer member 230 makes contact with the upper case at the time of replaying. Thus, when the clamper arm 22 opens to move the clamper 27 away from the disc at the time of ejection, the opening movement is made while bending the buffer member 230, thus eliminating the risk of making impact noises.

The first slider 50 and the second slider 60 are attached to the floating chassis 21. The first slider 50 and the second slider 60 are supported slidably on the chassis main body 20a.

As shown in FIG. 2, FIG. 3, FIG. 4 and FIG. 5, the first slider 50 is attached on one of the two sides of the chassis main body 20a, in parallel to the disc insertion/ejection directions in the floating chassis 21. The first slider 50 includes a slider main body 501 and a rack gear member 502 attached slidably to the slider main body 501. As will be described later, the rack gear member 502 has a projection 502a and a rack gear 503a.

As shown in FIG. 4, the slider main body 501 is formed with engagement grooves 50c, 50d for supporting the floating chassis 21. The engagement grooves 50c, 50d engage with engagement studs 21c, 21d (see FIG. 8) of the floating chassis 21 at a time of disc insertion/ejection. The slider main body 501 supports an end of the floating chassis 21.

When recording/replaying a disc, the slider main body 501 moves toward the disc insertion slot 12 as shown in FIG. 5, the engagement studs 21c, 21d on the floating chassis 21 are disengaged from the engagement grooves 50c, 50d, and the floating chassis 21 is supported by dampers to be described later.

The slider main body 501 of the first slider 50 has a portion closer to the disc insertion slot 12 formed with a guide groove 504 for engagement with an end of a lower roller (transporting roller) 70 which is to be described later. As shown in FIG. 4 and FIG. 5, the guide groove 504 has a higher and a lower horizontal portions 504a, 504b and a diagonal portion 504c which connects these horizontal portions 504a, 504b. As shown in FIG. 4, the lower roller 70 is at a position to make contact with the disc when an end of the lower roller 70 is in the horizontal portion 504a. When a disc is inserted and the first slider 50 slides toward the disc insertion slot 12 with respect to the chassis main body 20a as shown in FIG. 5, the end of the lower roller 70 moves through the diagonal portion 504c to the horizontal portion 504b. This travel of the lower roller 70 along the guide groove 504 moves the lower roller 70 away from the disc and to a turnabout position.

An urging spring 508 is placed between the slider main body 501 of the first slider 50 and the chassis main body 20a. The urging spring 508 urges the first slider 50 away from the disc insertion slot 12, i.e. in the direction indicated by Arrow A in FIG. 4 and FIG. 5. Likewise, an urging spring 506 is placed between the slider main body 501 and the rack gear member 502. The urging spring 506 urges the rack gear member 502 also in the direction indicated by Arrow A in FIG. 4 and FIG. 5.

As described earlier, the actuator 220 rocks as a disc is inserted, to bring the pin 221 of the actuator 220 into contact with the projection 502a of the gear member 502; this engages the rack gear 503a with a gear 503 on the chassis main body 20a against the urge from the urging spring 506. As will be described later, this gear 503 is rotated by disc insertion power transmission means via a secondary means thereof. The gear 503 and the rack gear 503a move the first slider 50 toward the disc insertion slot 12. The rack gear 503a of the rack gear member 502 engages with the gear 503, and as the gear 503 is driven, the rack gear 503a travels. As the rack gear 503a travels, part of the rack gear member 502 makes contact with the slider main body 501, and pushes the slider main body 501. As a result, the slider main body 501 is moved toward the disc insertion slot 12 against the urging spring 505. Then, when the slider main body 501 comes to a recording/replaying position, the slider main body 501 is locked at the recording/replaying position by an unillustrated eject pin which is linked to move with an eject button. When the eject button is pressed, the eject pin is unlocked, and the first slider 50 is moved by the urge from the urging spring 505, from the state shown in FIG. 5 back to the state shown in FIG. 4.

On the other hand, as shown in FIG. 2, FIG. 3, FIG. 6 and FIG. 7, the second slider 60 is assembled on the other side of the chassis main body 20a, in parallel to the disc insertion/ejection directions with respect to the floating chassis 21. The second slider 60 is formed with engagement grooves 60c, 60d for supporting the floating chassis 21. The engagement grooves 60e, 60f are engaged by engagement studs 21e, 21f provided on the floating chassis 21 when the disc is inserted/ejected. This side of the floating chassis 21 is supported by the second slider 60.

When recording/replaying a disc, the second slider 60 moves toward the disc insertion slot 12 as shown in FIG. 7, the engagement studs 21e, 21f on the floating chassis 21 are disengaged from the engagement grooves 60e, 60f, and the floating chassis 21 is supported by dampers which will be described later.

As described, the floating chassis 21 is supported by the first slider 50 on one side, and by the second slider 60 on the other side.

The second slider 60 is provided, in its portion closer to the disc insertion slot 12, with a guide groove 604 for engagement with a pin 707 provided at a tip portion of a lower roller plate 700 which supports the lower roller 70. The guide groove 604 is formed in such a way that the guide groove 604 allows the second slider 60 to slide as the first slider 50 slides, in response to a rocking movement of the lower roller plate 700.

The lower roller plate 700 is assembled rockably to the chassis main body 20*a*, with the lower roller 70 rotatably attached on a side facing the floating chassis 21. As shown in FIG. 6 and FIG. 7, on the side facing the second slider 60, the lower roller plate 700 has a pin 701 which is inserted to a hole in the chassis main body 20*a*. On the side facing the first slider 50, the lower roller plate 700 is supported by a pin of a support member, on a support plate (not illustrated) which is mounted on the chassis main body 20*a*.

The first slider 50 and the second slider 60 each have a tip facing toward the disc insertion slot 12. These tips are provided with cam portions 505, 605 respectively, for lifting/lowering an upper roller (disc guide roller) 80, which will be described later. When cam follower portions of the support member 810 in the upper roller 80 are under the cam portions 505, 605, i.e. when a disc is inserted, the upper roller 80 is in contact with the disc. When the disc is replayed, the first slider 50 and the second slider 60 slide toward the disc insertion slot 12; the cam follower portions of the support member 810 in the upper roller 80 are now above the cam portions 505, 605, and the upper roller 80 is moved away from the disc.

As described above, the lower roller 70 and the upper roller 80 which are provided on the disc insertion slot 12 make contact with the disc when the disc comes in and goes out whereas these rollers are away from the disc at the time of replay.

Figure 9:
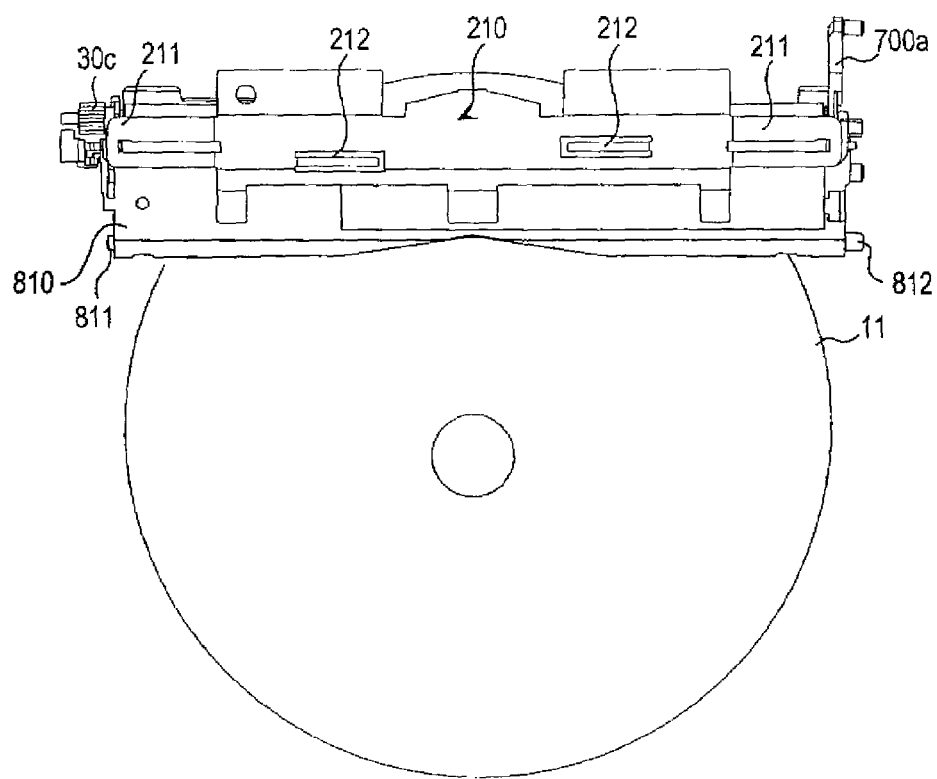
FIG. 9 is a plan view which shows a portion including an upper and a lower rollers under a state of transporting a disc when the disc is inserted into a disc insertion slot in the disc player apparatus according to the present invention.
Figure 10:
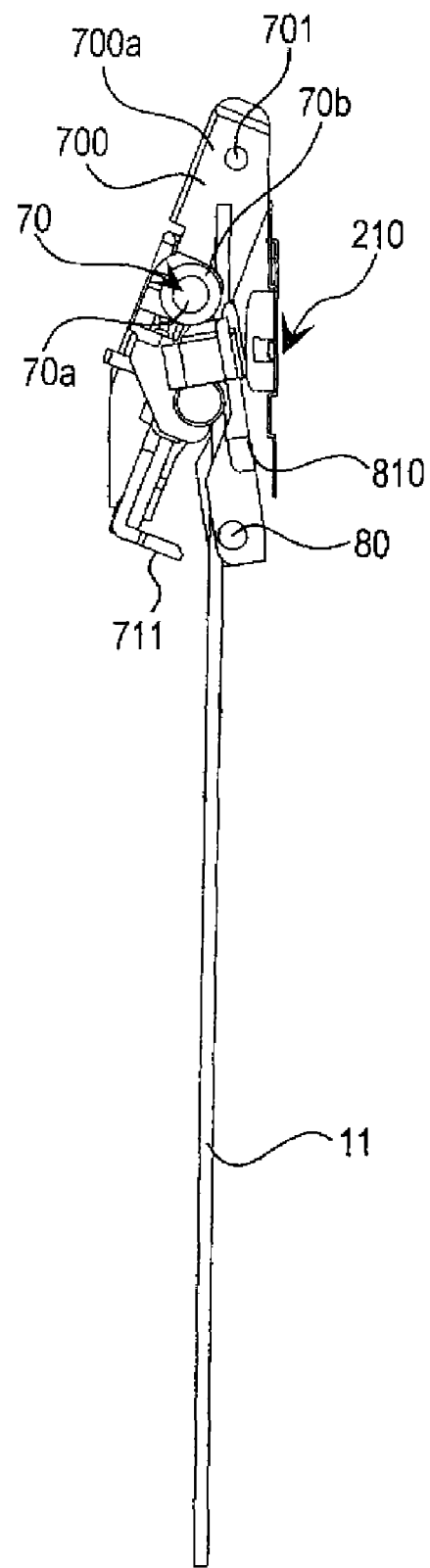
FIG. 10 is a side view, which shows a portion including the upper and the lower rollers under the state of transporting a disc when the disc is inserted into the disc insertion slot in the disc player apparatus according to the present invention.
Figure 11:
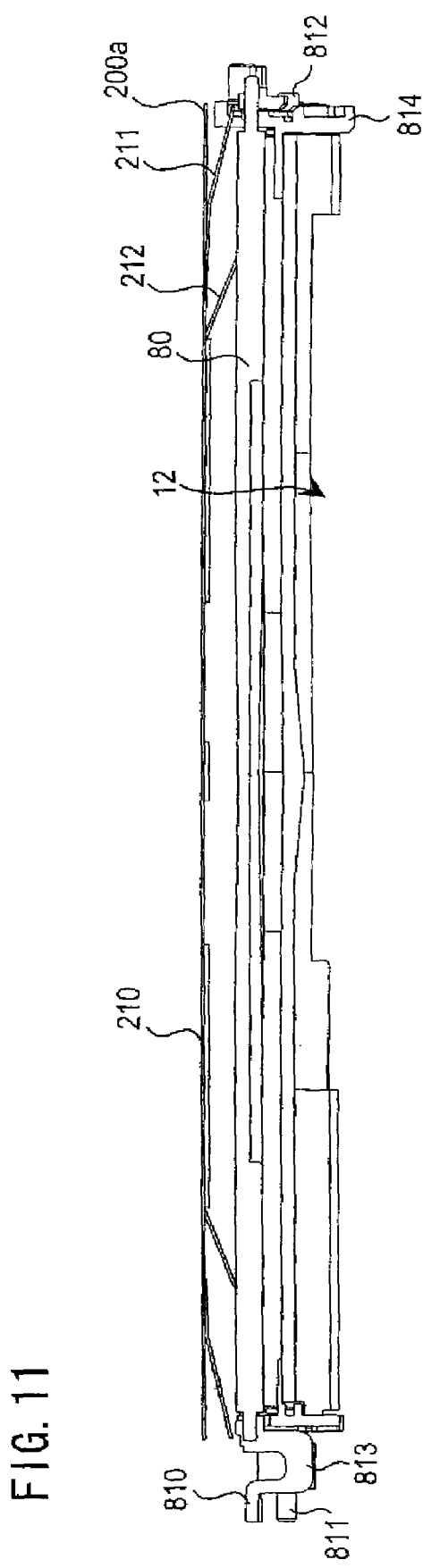
FIG. 11 is a plan view which shows a portion including the upper roller at the disc insertion slot in the disc player apparatus according to the present invention.

FIG. 9 is a plan view which shows a portion including the upper and the lower rollers under a state of transporting a disc when the disc is inserted into the disc insertion slot. FIG. 10 is a side view thereof. FIG. 11 is a plan view which shows a portion including the upper roller at the disc insertion slot.

As shown in FIG. 2, FIG. 4, FIG. 5, FIG. 6, FIG. 7, FIG. 9, FIG. 10 and FIG. 11, the upper and the lower rollers 70, 80 disposed at the disc insertion slot 12 are supported rockably on the chassis main body 20*a* by respective support members. Specifically, the upper roller 80 is made of SUS (Steel Use Stainless) 301 stainless steel for example, and is supported pivotably at an end of the roller support member 810 on a side facing the floating chassis 21. The roller support member 810, which is made of e.g. PPS (Poly phenylene sulfide) containing inorganic glass filler by 60% for increased strength, has a side facing the second slider 60, provided with a pin 811 located closely to the disc insertion slot 12. The pin 811 is inserted into a hole made in the chassis main body 20*a*. On the side facing the first slider 50, a support wall 20*e* is provided to make a predetermined gap between itself and the chassis main body 20*a*. The support wall 20*e* has a hole, into which the pin 812 of the roller support member 810 is inserted. By inserting the pins 811, 812 into their respective holes, the roller support member 810 is secured rockably relative to the chassis main body 20*a*.

A cam follower portion 813 is formed to extend from the roller support member 810, on the side facing the first slider 50, at a place near where the roller support member supports the upper roller 80, whereas a cam follower portion 814 is formed to extend on the side facing the second slider 60. The cam follower portions 813, 814 make contact with the cam portions 505, 605 respectively. The roller support member 810 rocks in response to the sliding movement of the first and the second slider 50, 60, bringing the upper roller 80 into contact with the disc 11 or away from the disc.

As shown in FIG. 9 and FIG. 11, the roller support member 810 as described above is contacted by a flat spring 210 which is made of e.g. SUS 301 and attached to the upper case 200*a*. The flat spring 210 urges the upper roller 80 toward the disc. The flat spring 210 is fixed to the upper case 200*a* in such a way that when the upper case 200*a* is assembled to the chassis main body 20*a*, two ends 211 of the flat spring 210 make contact with respective ends of the roller support member 810. In this way, by fixing a flat spring of a predetermined shape onto the upper case 200*a*, a predetermined pressing force can be applied easily to the upper roller 80 when the upper case 200*a* is assembled to the chassis main body 20*a*. Further, since the flat spring 210 presses both ends of the roller support member 810, and the roller support member 810 transfers a pressing force to the upper roller 80, the upper roller 80 is pressed more evenly, and the disc receives more uniform pressure along its lateral directions, leading to less problems such as a disc traveling diagonally, and therefore leading to smoother disc transport than in cases where the upper roller 80 is urged directly by a coil spring for example.

Further, as shown in FIG. 11, the flat spring 210 is provided with a flat spring portion 212 which makes contact with the upper roller 80 when the upper roller 80 comes off the disc; this reduces vibration of the upper roller 80 when the disc is replayed.

As shown in FIG. 10, the lower roller 70 includes a roller shaft 70*a* made of SUS 301, and a rubber roller 70*b* made of silicone rubber and attached to the shaft, so the roller can make contact without damaging the recording surface of the disc 11. When transporting the disc, the disc 11 is sandwiched between the upper roller 80 and the lower roller 70, and the flat spring 210 which presses the upper roller 80 gives a predetermined amount of pressure to the disc 11. The lower roller 70 is rotatably supported by a lower roller plate 700 which is made of a metal plate. The roller shaft 70*a* has an end provided with a gear 30*c* for transferring a rotating force from a drive motor 300 to rotate the lower roller 70.

The lower roller plate 700 has a side facing the second slider 60 provided with a plate support member 700*a* as described earlier, which has a pin 701 for engagement with the guide groove 604 of the second slider 60. The plate support member 700*a* has another pin (not illustrated) for engagement with a hole (not illustrated) made in the chassis main body 20*a*. On the side facing the first slider 50, the support wall 20*e* has a hole (not illustrated), to which a pin (not illustrated) provided on the lower roller plate 700 is inserted. As described, the lower roller plate 700 is attached rockably between the chassis main body 20*a* and the support wall 20*e*.

As described earlier, the lower roller plate 700 moves away from the disc or to make contact with the disc, in response to the sliding movement of the first slider 50. In response to the movement of the lower roller plate 700, the second slider 60 moves also.

As shown in the figures, the lower roller plate 700 is provided with a switching tab 711 as will be described later, in order to stop the drive motor 300. As the lower roller 70 moves along the guide groove 504 in the first slider 50, and when the lower roller 70 has completed its travel from a position of making contact with the disc, to the turnabout position, the switching tab 711 makes contact with a switch which is mounted on the printed circuit board. As the switching tab 711 presses the switch, the drive motor stops driving and the movement of the first slider 50 is stopped.

As shown in the figure, a drive gear (not illustrated) of the drive motor 300 engages with the gear 30*a*. The gear 30*a* engages with the gear 30*b* of the gear shaft 30. As the drive motor 300 drives, the gear shaft 30 is rotated. The gear shaft 30 is provided with a gear 30*d* which engages with the gear 30*c* on the roller shaft 70*a*, and a gear 30*e* which engages with the gear 503. The driving force from the drive motor 300 is transmitted via the gear shaft 30 and the gears thereon, to rotate the lower roller 70 and to move the first slider 50.

As described earlier, the floating chassis 21 is elastically supported with respect to the main body case 20 via dampers so as to sink by a predetermined amount with respect to the main body case 20 when a disc 11 is inserted. In the present embodiment, three dampers 40 support the floating chassis 21 as shown in the figures.

Figure 12:
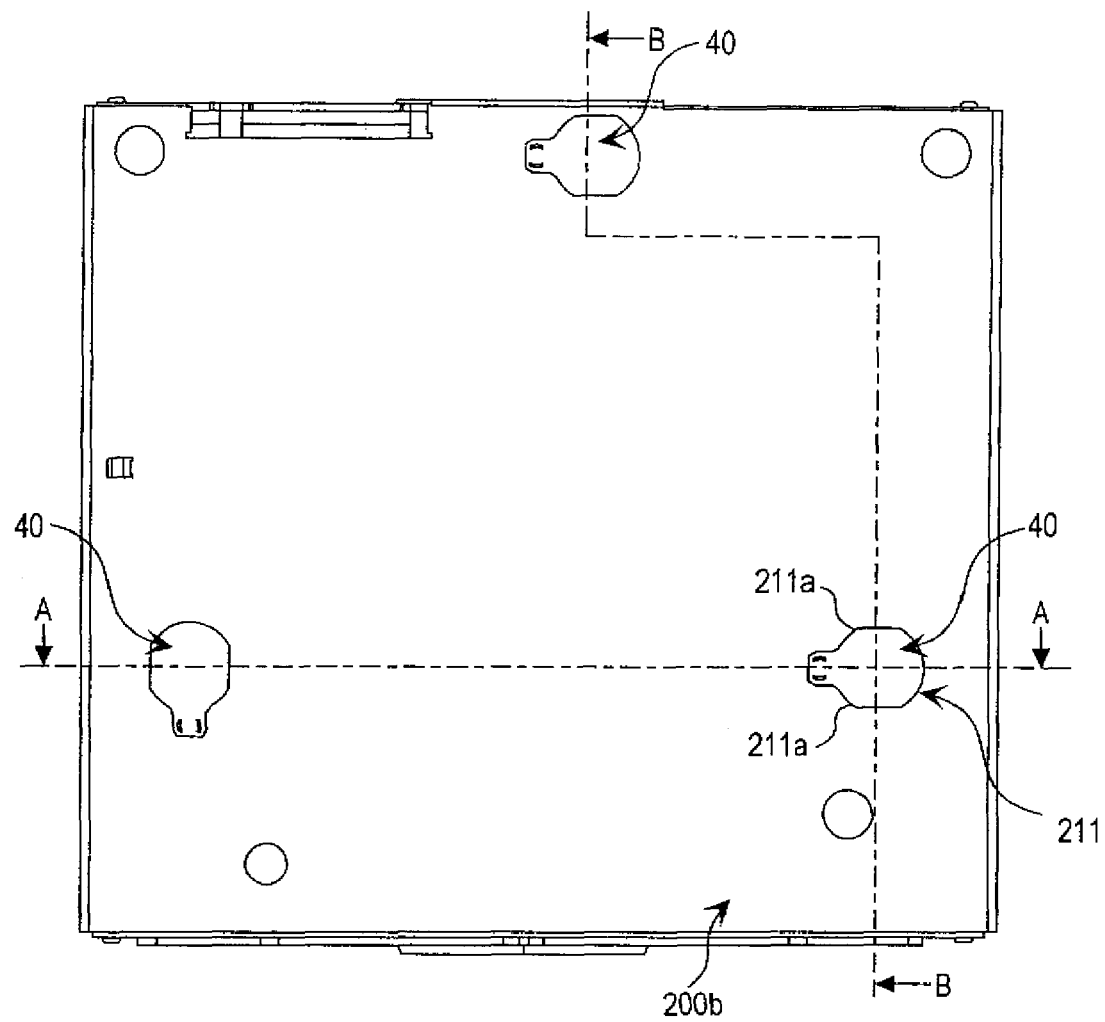
FIG. 12 is a rear view of the disc player apparatus according to the present invention.
Figure 13:
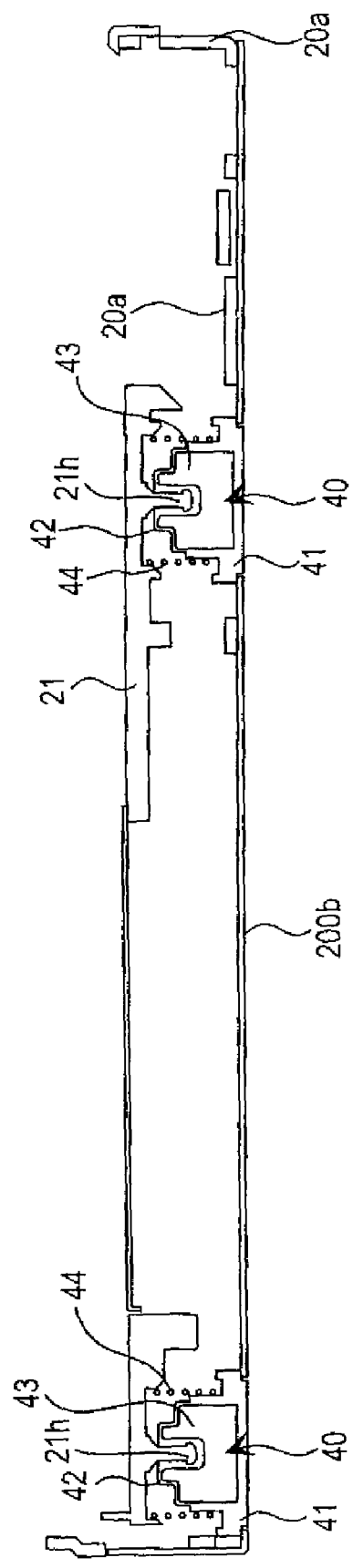
FIG. 13 is a sectional view taken in lines A-A in FIG. 12.
Figure 14:
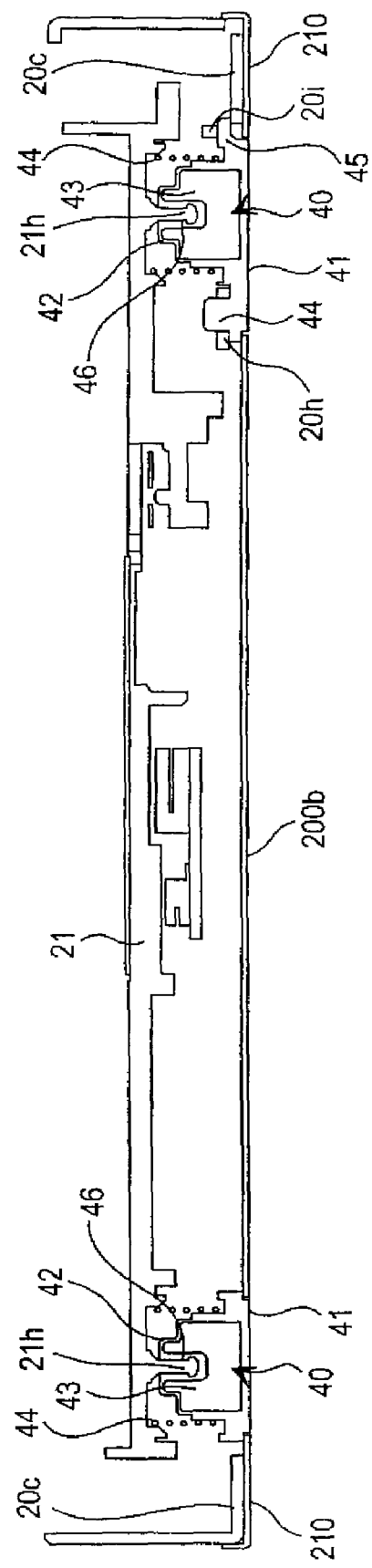
FIG. 14 is a sectional view taken in lines B-B in FIG. 12.
Figure 15:
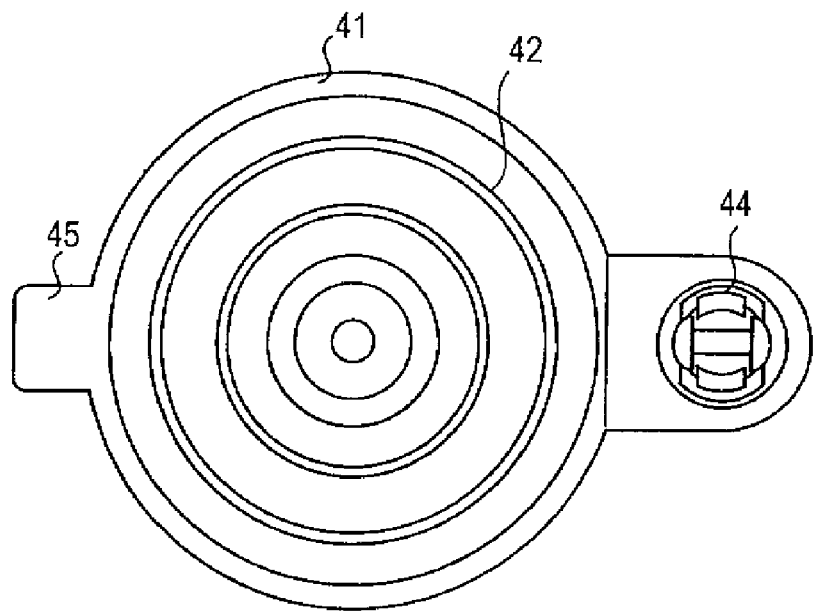
FIG. 15 is a plan view which shows a damper used in the disc player apparatus according to the present invention.
Figure 16:
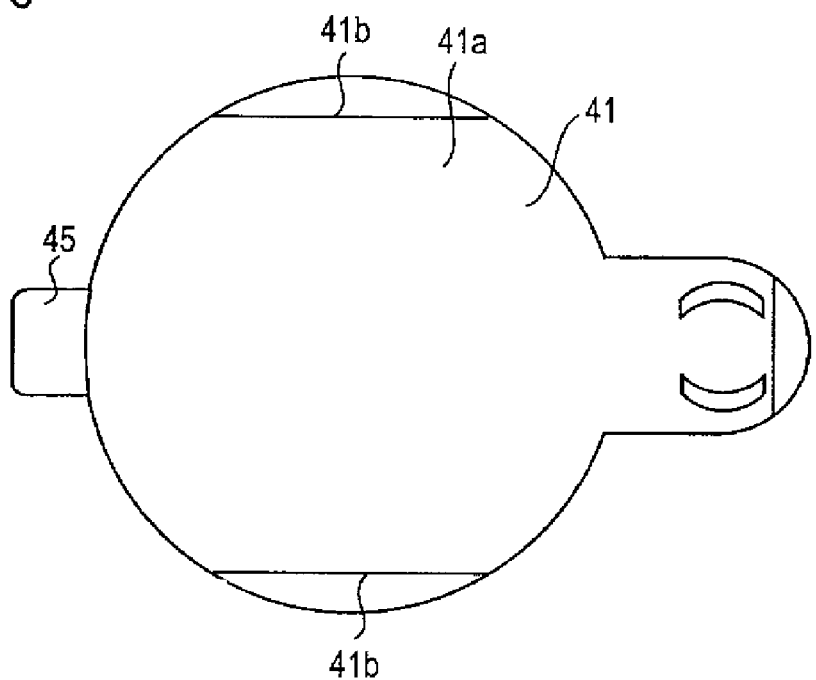
FIG. 16 is a rear view which shows the damper used in the disc player apparatus according to the present invention.

FIG. 12 is a rearview of the disc player apparatus according to the present invention. FIG. 13 is a sectional view taken in lines A-A in FIG. 12. FIG. 14 is a sectional view taken in lines B-B in FIG. 12. FIG. 15 is a plan view which shows the dampers used in the disc player apparatus according to the present invention, and FIG. 16 is a rear view which shows the dampers used in the disc player apparatus according to the present invention.

As shown in FIG. 10 through FIG. 14, the floating chassis 21 is provided with support pins 21h which are inserted into support holes 46 of the dampers 40. The damper 40 includes an outer frame 41 made of polypropylene, and a damper portion 42 made of elastomer. The damper portion 42 is filled with silicone oil. Further, a compression spring 44 is placed between the floating chassis 21 and the damper outer frame 41.

As shown in FIG. 15, the damper outer frame 41 includes a main element 41a which is circular in a plan view, a pin portion 44 and an insertion tab 45 which extend from the main element for attaching to the chassis main body 20a. Holes 20h and 20i are made on each location on the chassis main body 20a to which the damper 40 is attached. By inserting the insertion tab 45 to the hole 20i and the pin portion 44 in the hole 20h, the damper 40 is secured at a predetermined position on the chassis main body 20a.

Further, the damper outer frame 41 has a side to face the lower case 200b, on which the main element 41 is provided with stepped portions for reliable engagement with the lower case 200b. The lower case 200b is provided with engagement portion 211 for engagement by the outer frame 41 of the damper. A dimension between two mutually opposed sides 211a in the engagement portion 211, and a dimension between two stepped portions 41b in the damper outer frame 41 are so controlled as to allow press-fit assembly. As a result of such engagement between the engagement portion 211 and the stepped portion 41b of the main element 41a, fixing strength of the dampers 40 is improved when the lower case 200b is assembled to the chassis main body 20a.

Further, the roller support member 810 is provided with disc detection sensors 820, 821 in the present embodiment. The embodiment is designed to load a disc which has an outer diameter of 12 cm, but not to load a disc which has an outer diameter of 8 cm. Specifically, a loading operation starts when the sensor 820 is turned ON, but the disc is returned if the sensor 821 is not turned ON within a predetermined time since the sensor 820 has turned ON, in which case the drive motor 300 is driven in the reverse direction and the disc is ejected. Likewise, the drive motor 300 is driven in the reverse direction and the disc is ejected if the sensor 821 is turned ON for a shorter period of time than predetermined. Obviously, it is possible to design so as to load whichever of a 12 cm outer diameter disc and a 8 cm outer diameter disc.

Hereinafter, an operation of the present embodiment will be described.

FIG. 2 shows a state before a disc is inserted. When a disc 11 is inserted as shown in FIG. 9, sensors 820, 821 detect the insertion of the disc 11, and the drive motor 300 is driven. The drive motor 300 rotates the gear shaft 30, and the driving force from the drive motor 300 is transmitted via the gear shaft 30 and the related gears, to turn the lower roller 70. The disc 11 is thus held between the upper roller 80 and the lower roller 70, and is given a predetermined amount of pressure from the flat spring 210 which presses the upper roller 80. Under this condition, the disc 11 is transported by the rotation of the lower roller 70 toward the clamper 27, i.e. toward the far end of the disc player apparatus. During this step, the first slider 50 and the second slider 60 are held in the state shown in FIG. 4 and FIG. 6. Therefore, as shown in FIG. 2, the tab 24 of the clamper arm 22 makes contact with the cam 507, holding the clamper 27 away from the turntable 14 against the urge from the spring 22s.

As the lower roller 70 rotates and the disc 11 goes into the apparatus, the foremost edge of the disc 11 makes contact with the actuator 220 on the clamper arm 22. As the disc 11 goes further, the actuator 220 is pushed to rock. The actuator 220 continues to be pushed by part of the disc until the disc 11 arrives at the replay position; therefore, the actuator 220 continues rocking to move away from the disc. When the disc 11 reaches the predetermined replay position, the pin 221 at the tip of the actuator 220 makes contact with the projection 502a of the rack gear member 502 in the first slider 50, moving the rack gear member 502 toward the disc insertion slot 12 thereby bringing the rack gear 503a into engagement with the gear 503 so that the driving force from the drive motor 300 begins to move the first slider 50.

Figure 17:
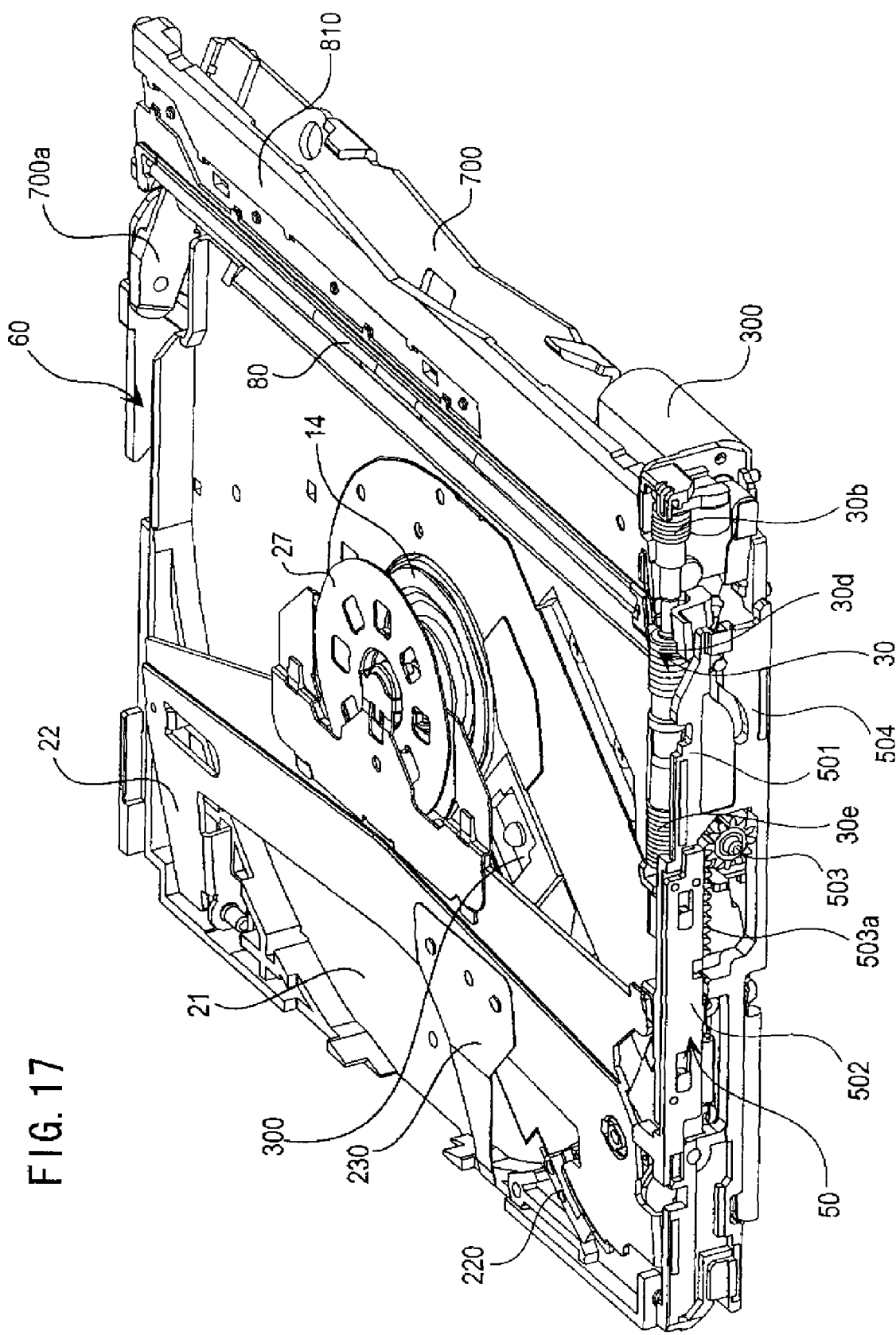
FIG. 17 is a perspective view which shows a state in which the first slider begins a move in the disc player apparatus according to the present invention.
Figure 18:
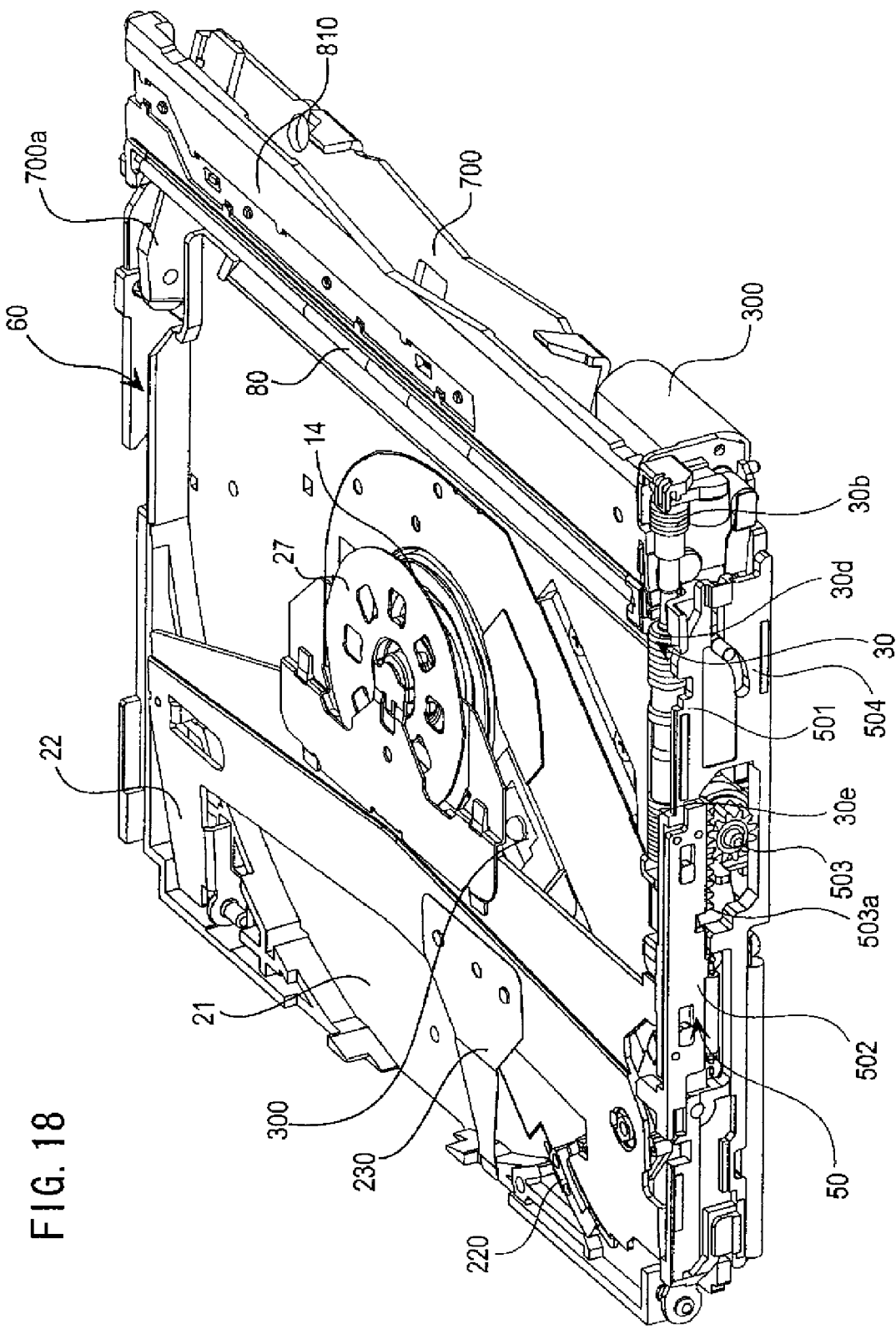
FIG. 18 is a perspective view which shows a state in which the first slider has made a slight move in the disc player apparatus according to the present invention.
Figure 19:
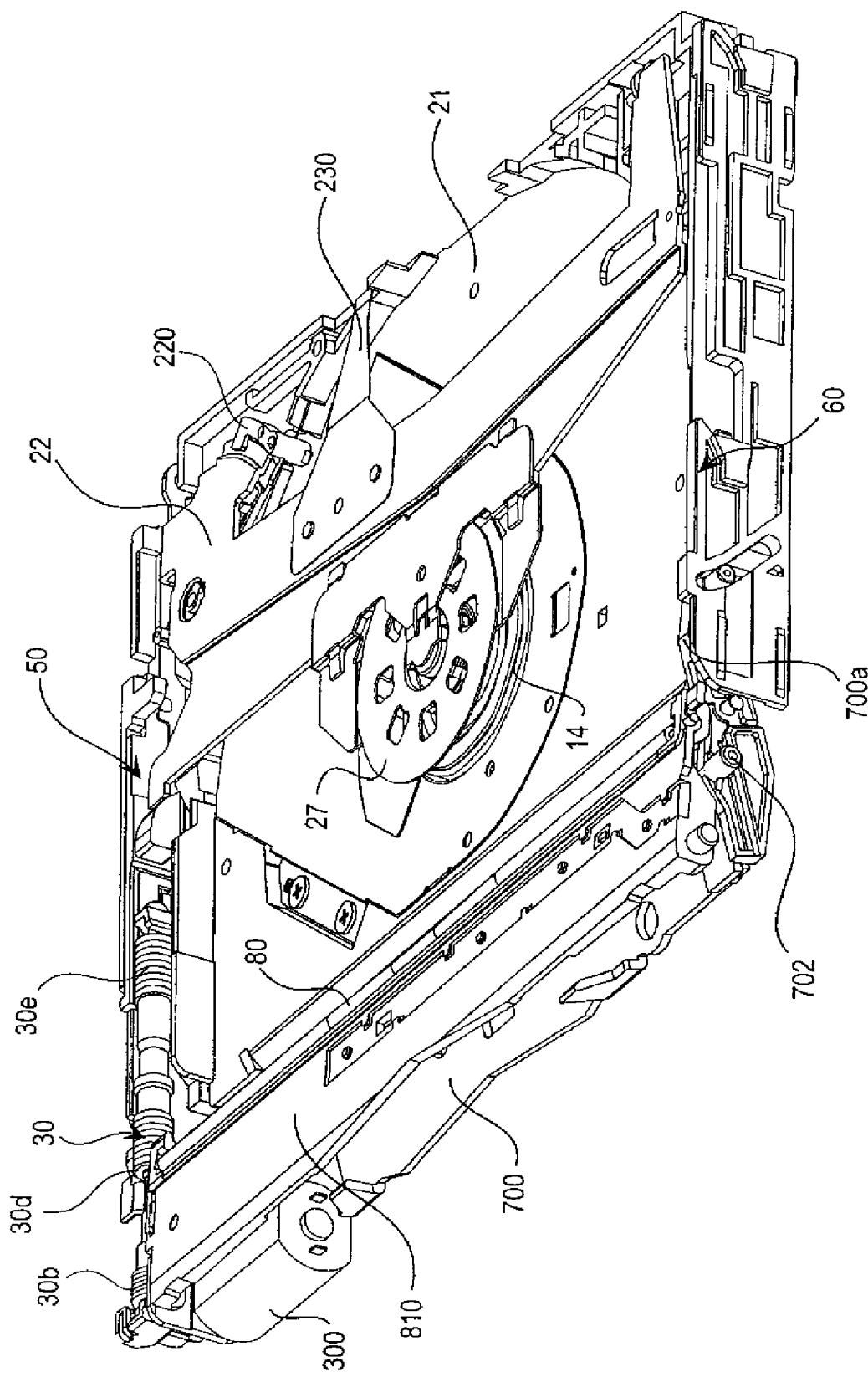
FIG. 19 is a perspective view which shows a state in which a clamper arm has moved toward the disc and has clamped the disc in the disc player apparatus according to the present invention.

FIG. 17 shows a state in which the first slider 50 begins its movement, FIG. 18 shows a state in which the first slider has moved slightly, and FIG. 19 shows a state in which the clamper arm 22 has moved toward the disc and has clamped the disc, each in a perspective view. It should be noted that the disc is not illustrated in these figures.

As the rack gear 503a engages with the gear 503, the driving force from the drive motor 300 is transmitted via the gear shaft 30 to the gear 503, to move the rack gear 503a and to move the first slider 50 toward the disc insertion slot 12. As the first slider 50 moves, the tab 24 of the clamper arm 22 comes off the cam portion 507, upon which the urge from the spring 22s moves the clamper arm 22 toward the disc 11 to press the clamper 27 onto the turntable 14 which is provided with a magnet. The urge from the spring and a magnetic force from the magnet on the turntable 14 press and hold the disc 11 on the turntable 14 while the disc is between the clamper 27 and the turntable 14.

The movement of the first slider 50 brings the lower roller plate 700 down along the guide groove 504, and the lower roller 70 comes off the disc 11. When the disc 11 is held by the clamper 27, the lower roller 70 has come off the disc 11. Although the drive motor 300 continues to move the first slider 50, the lower roller 70 is off the disc 11, and so there is no risk for the roller to slip on the disc 11 and damage it. When the lower roller 70 comes off the disc 11, the gear 30c of the lower roller 70 is disengaged from the gear 30d of the gear shaft 30. As a result, the lower roller 70 stops its rotation.

Figure 20:
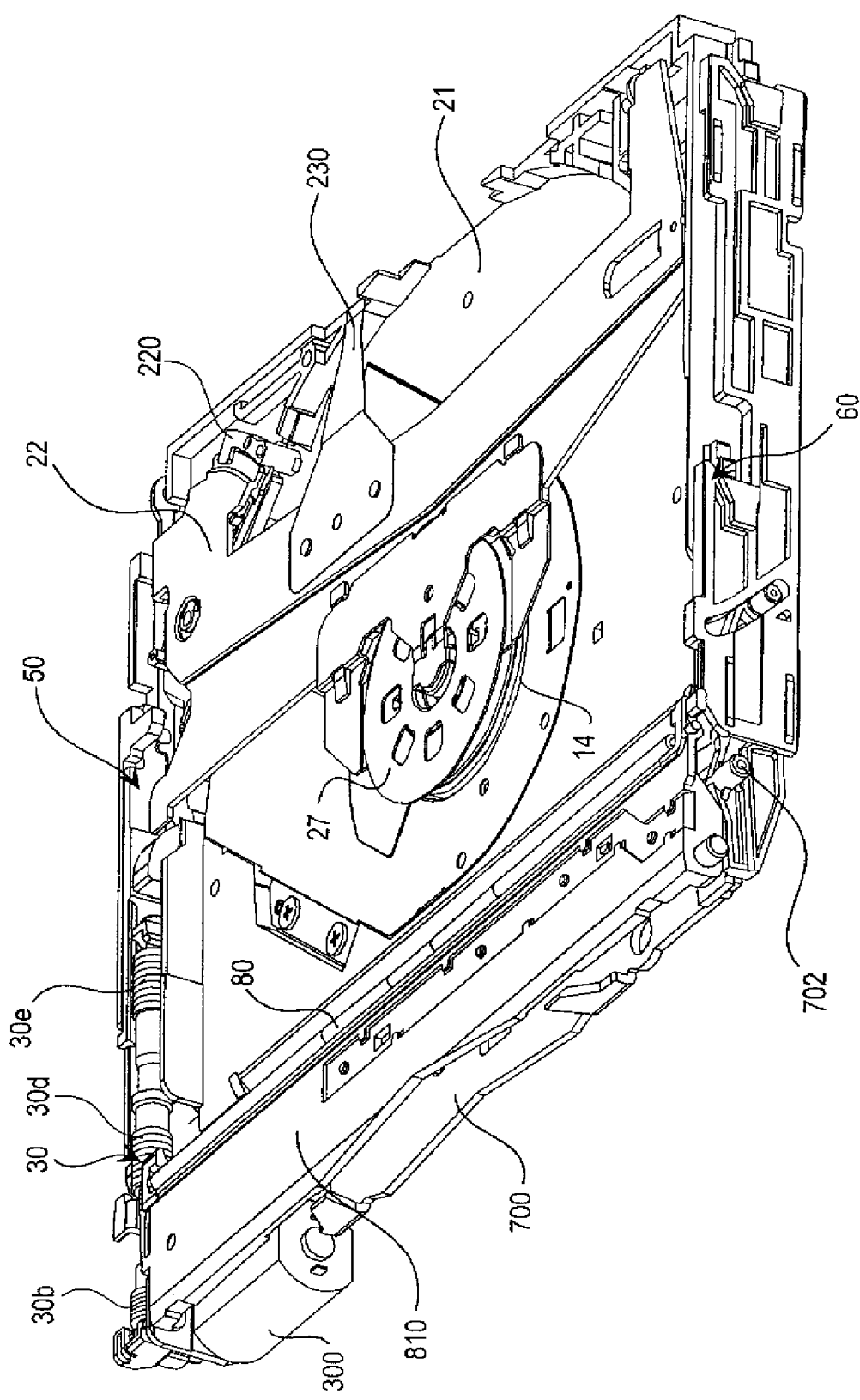
FIG. 20 is a perspective view which shows a state in which the clamper arm has moved toward the disc and thereafter, the first slider has made a further move in the disc player apparatus according to the present invention.
Figure 21:
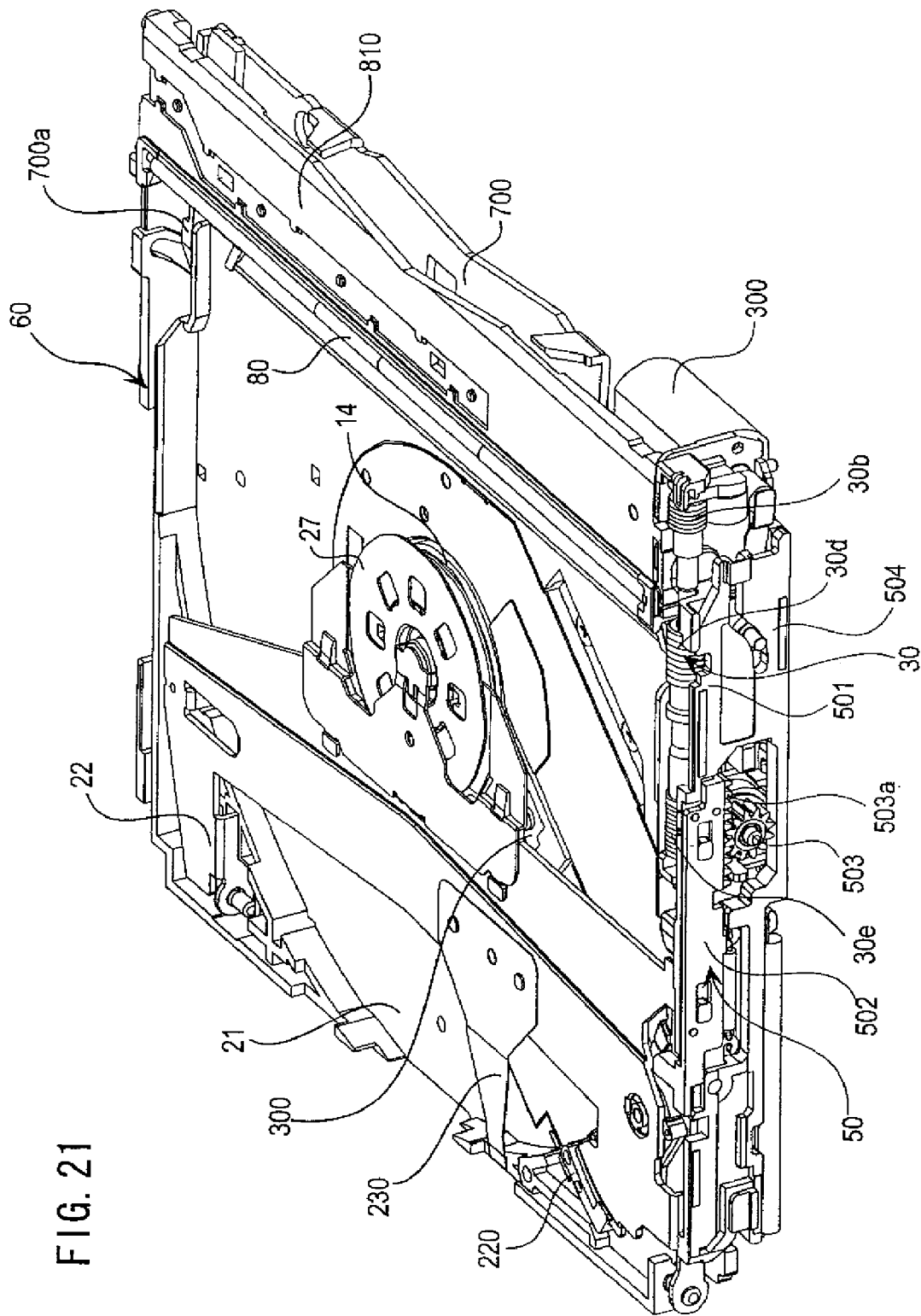
FIG. 21 is a perspective view which shows a state in which the clamper arm has moved toward the disc and thereafter, the first slider has made a further move in the disc player apparatus according to the present invention.

Further, as shown in FIG. 20 and FIG. 21, the drive motor 300 moves the first slider 50 toward the disc insertion slot 12, making the end of the lower roller 70 pass through the diagonal portion 504c and reach the horizontal portion 504b. This movement of the lower roller 70 along the guide groove 504 causes the lower roller 70 to come off the disc and travel to the turnabout position while lowering the lower roller plate 700. As the lower roller plate 700 moves, the second slider 60 also moves along the guide groove 604 toward the disc insertion slot 12.

Figure 22:
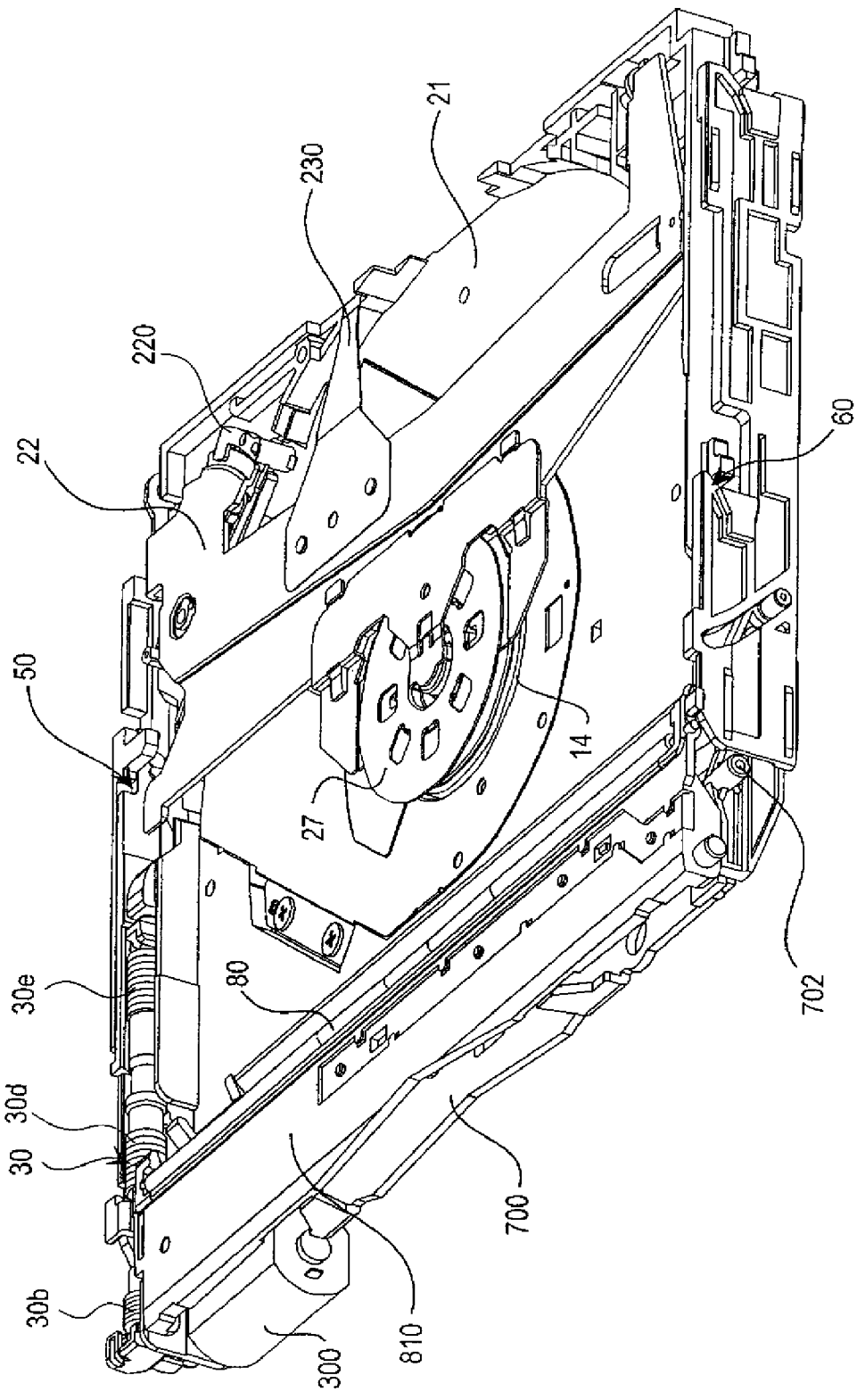
FIG. 22 is a perspective view which shows a state of recording/replaying in the disc player apparatus according to the present invention.
Figure 23:
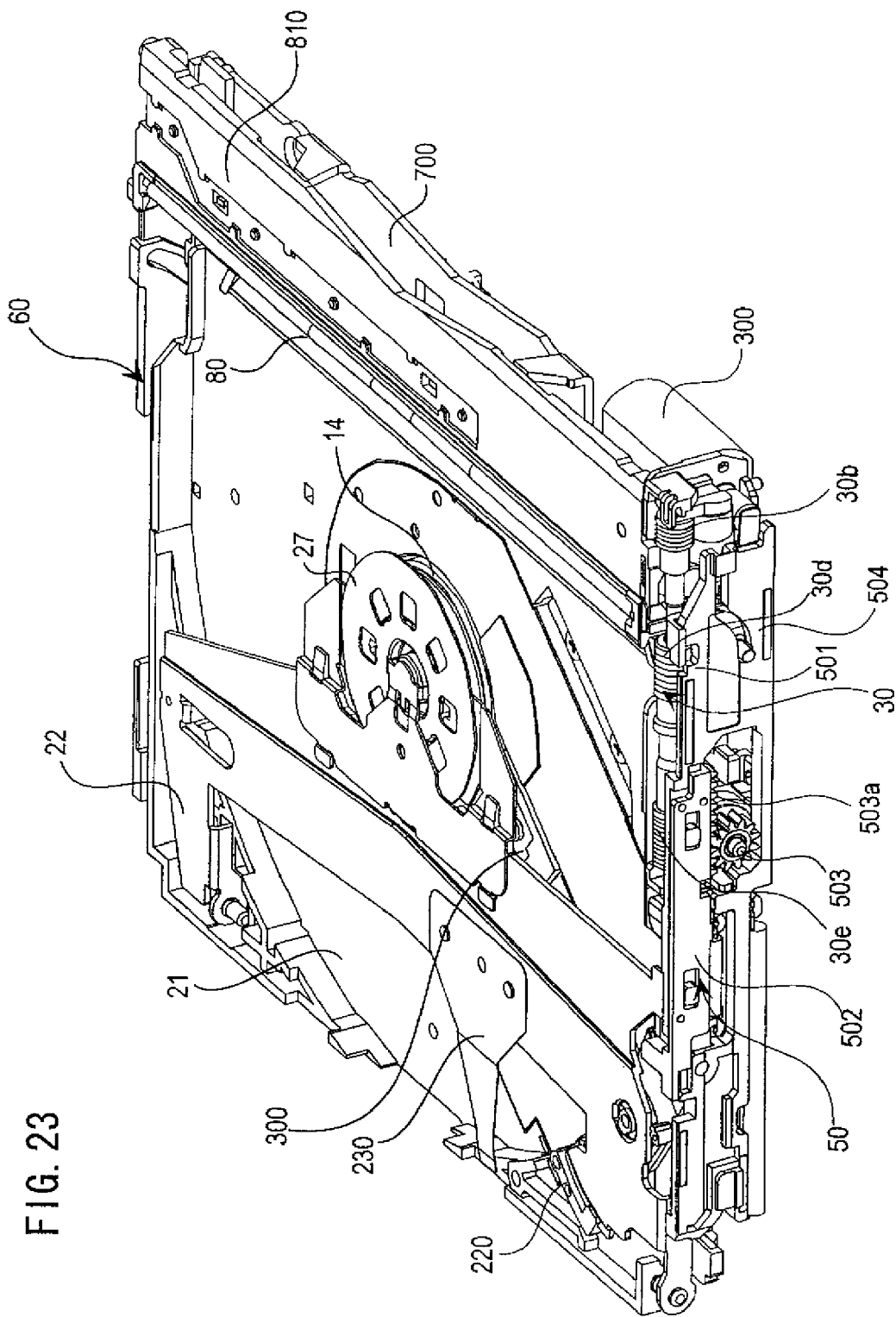
FIG. 23 is a perspective view which shows the state of recording/replaying in the disc player apparatus according to the present invention.

When the first and the second sliders 50, 60 have moved to the recording/replaying position as shown in FIG. 22 and FIG. 23, the engagement studs 21c, 21d, 21e, 21f on the floating chassis 21 are disengaged from the engagement grooves 50c, 50d in the first slider 50 and from the engagement grooves 60e, 60f in the second slider 60. The engagement studs 21c, 21d on the floating chassis 21 are disengaged from the engagement grooves 50c, 50d, and the floating chassis 21 is supported by the dampers 40. The cam follower portions 813, 814 on the roller support member 810 make contact with the cam portions 505, 605 respectively, the roller support member 810 rises and the upper roller 80 comes off the disc 11.

When the lower roller 70 is moved from the position of contact with the disc, to the turnabout position, the switching tab 711 makes contact with the switch which is mounted on the printed circuit board. As the switching tab 711 presses the switch, the drive motor 300 stops and the first slider 50 stops moving, and the system comes to the recording/replaying state. As described earlier, when the slider main body 501 comes to the recording/replaying position, the slider main body 501 is locked at the recording/replaying position by the eject pin which is linked to the unillustrated eject button.

Now, when the eject button is pressed for ejecting the disc 11, the eject pin is unlocked, and the first slider 50 is moved by the urge from the urging spring 508, and the state in FIG. 5 changes back to the sate in FIG. 4, i.e. the state shown in FIG. 2.

Figure 24:
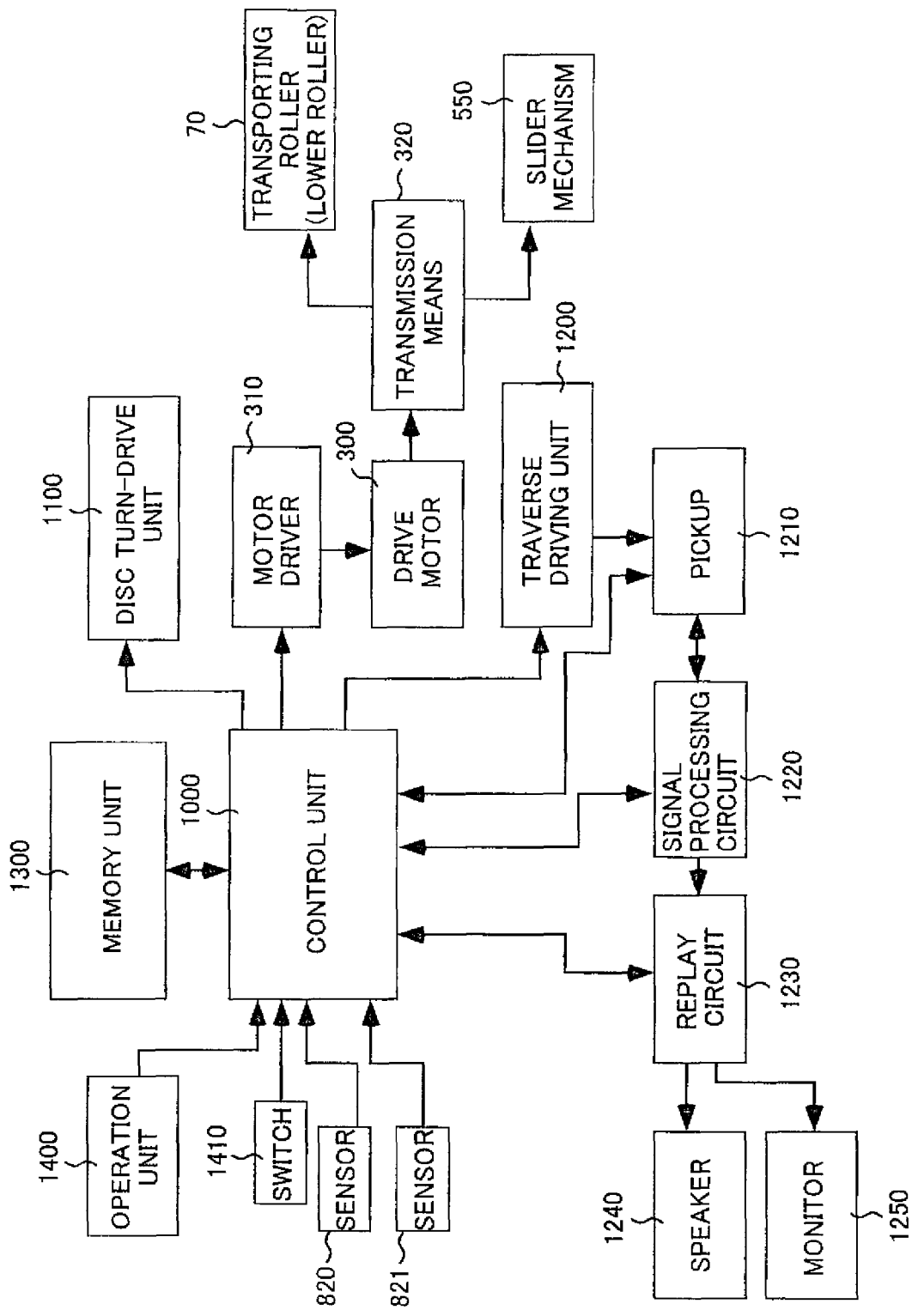
FIG. 24 is a block diagram which shows a circuit configuration of the disc player apparatus according to the present invention.

FIG. 24 is a block diagram which shows a circuit configuration of the disc player apparatus according to the present invention. Description will now cover the circuit configuration, with reference to FIG. 24.

The disc player apparatus includes a control unit 1000 provided by a microcomputer. The control unit 1000 is connected with a memory unit 1300. The memory unit 1300 stores programs for controlling the operation of the disc player apparatus. The control unit 1000 provides control over various operations of the disc player apparatus based on the programs read from the memory unit 130.

The control unit 1000 is connected with: an operation unit 1400 which issues various instruction including eject button commands and ON/OFF switching commands; sensors 820, 821 which detect e.g. positions of the disc 11; and a switch 1410 which is turned ON/OFF depending on the position of the transporting roller (lower roller) 70. Based on instruction signals from the operation unit 1400 and detection signals from the sensors 820, 821 as well as signals from the switch 1410, the control unit 1000 controls operations of the disc turn-drive unit 1100, the motor driver 310, a traverse driving unit 1200, etc.

The motor driver 310 which is controlled by the control unit 1000 supplies electric power for driving the drive motor 300. The driving force of the drive motor 300 is transmitted by transmission means 320 provided by a set of various gears, etc., to the transporting roller (lower roller) 70 to rotate the transporting roller (lower roller) 70. The rotating movement of the transporting roller (lower roller) 70 carries the disc 11 onto the turntable 14 as well as carrying the disc 11 out of the apparatus.

Further, the driving force of the drive motor 300 is supplied from the transmission means 320 to a slider mechanism 550 provided by the first slider 50 and other components in order to perform a clamping or an unclamping operation.

Further, the control unit 1000 controls operations of the disc turn-drive unit 1100 and the traverse driving unit 1200. The disc turn-drive unit 1100 drives the turntable 14 thereby rotating a disc at a predetermined speed. The traverse driving unit 1200 traverses the pickup radially of the turntable 14 from a position nearby.

The control unit 1000 is connected with a signal processing circuit 1220. The signal processing circuit 1220 processes signals read by the pickup or signals for recording on the disc. Signals read by the pickup and processed by the signal processing circuit 1220 are supplied to the replay circuit 1230. The replay circuit 1230 receives output from the signal processing circuit 1220, replays audio signals and image signals, and outputs these signals to an output unit including a speaker 1240 and a monitor 1250.

Next, an operation of the disc player apparatus according to the present invention will be described while making further reference to the block diagram in FIG. 24.

FIG. 2 shows a state before a disc is inserted. When a disc 11 is inserted as shown in FIG. 9, the control unit 1000 detects the insertion of the disc 11 from outputs made by the sensors 820, 821, and controls the motor driver 310 to drive the drive motor 300.

The drive force from the drive motor 300 is transmitted via the transmission means 320 provided by gears, etc. to rotate the transporting roller (lower roller) 70. The disc 11 is thus held by the upper roller 80 and the transporting roller (lower roller) 70, and is transported toward the clamper 27, i.e. toward the far end of the disc player apparatus by the rotation of the transporting roller (lower roller) 70. During this step, the clamper 27 is off the turntable 14 as described earlier.

The disc 11 is thus moved in the apparatus by the rotation of the transporting roller (lower roller) 70, and when the disc 11 reaches a predetermined replay position, the drive force of the drive motor 300 is then used for a traveling operation of the slider mechanism 550 which includes the first slider 50.

The drive force of the drive motor 300 is now supplied from the transmission means 320 to the slider mechanism 550; the clamper arm 22 moves towards the disc 11 to press the clamper 27 onto the turntable 14 which is provided with a magnet, and the urge from the spring and the magnetic force from the magnet on the turntable 14 hold the disc 11 which is sandwiched between the clamper 27 and the turntable 14, on the turntable 14 under a pressure.

Meanwhile, the slider mechanism 550 lowers the lower roller plate 700 along the guide groove 504, bringing the transporting roller (lower roller) 70 off the disc 11. When the disc 11 is held by the clamper 27, the transporting roller (lower roller) 70 is off the disc 11.

The control unit 1000 continues to drive the drive motor 300, and the slider mechanism 550 keeps the first slider 50 to move. However, since the transporting roller (lower roller) 70 is off the disc 11, the roller does not slip on the disc 11 for example, therefore eliminating damage. When the transporting roller (lower roller) 70 comes off the disc 11, the gear which transmits power to the transporting roller (lower roller) 70 is disengaged. As a result, the transporting roller (lower roller) 70 stops its rotation.

As shown in FIG. 20 and FIG. 21, the drive motor 300 further continues to move the first slider 50. When the first slider 50 slides toward the disc insertion slot 12, the end of the lower roller 70 passes through the diagonal portion 504c and comes to the horizontal portion 504b. This movement of the lower roller 70 along the guide groove 504 causes the lower roller 70 to come off the disc and travel to the turnabout position while lowering the lower roller plate 700. As the lower roller plate 700 moves, the second slider 60 also moves along the guide groove 604 toward the disc insertion slot 12.

When the first and the second sliders 50, 60 have moved to the recording/replaying position as shown in FIG. 22 and FIG. 23, the floating chassis 21 is supported by the dampers 40, and the upper roller 80 comes off the disc 11.

Then, when the transporting roller (lower roller) 70 is moved from the position of contact with the disc, to the turnabout position, the switch 1410 is actuated, and based on the output from the switch 1410, the control unit 1000 stops the drive motor 300. The movement of the slider mechanism 550 (the first slider 50) is stopped, and the system assumes a recording/replaying state. At the recording/replaying position, the slider mechanism 550 (slider main body 501) is locked at the recording/replaying position by the eject pin which is linked to the unillustrated eject button.

Now, when the eject button in the operation unit 144 is pressed for ejecting the disc 11, the eject pin is unlocked, and the first slider 50 is moved by the urge from the urging spring 508, and the state in FIG. 5 changes back to the sate in FIG. 4, i.e. the state shown in FIG. 2.

When the control unit 1000 detects, from an output made by the operation unit 1400, that the eject button is pressed, the control unit 1000 drives the drive motor 300 in order to perform an operation to eject the disc 11. The motor driver 310 now supplies power in such a way that the drive motor 300 is driven in the direction to eject the disc 11. The driving force from the drive motor 300 is transmitted by the transmission means 320 to the transporting roller (lower roller) 70. Thus, the transporting roller (lower roller) 70 rotates in the direction of ejecting the disc 11, and the disc 11 held between the upper roller 80 and transporting roller (lower roller) 70 is ejected.

During the process, the control unit 1000 controls the motor driver 310 so that the transporting roller (lower roller) 70 is rotated in the direction of ejecting the disc 11 for a predetermined time. The predetermined time may be counted from the moment when the switching tab 711 has left the switch. Under the control provided by the control unit 1000, the transporting roller (lower roller) 70 makes contact with the disc 11, and rotates for the predetermined time in the direction of ejecting the disc 11.

Thereafter, the control unit 1000 controls the motor driver 310 so that the transporting roller (lower roller) 70 is rotated in the direction of loading the disc 11 for a predetermined time (0.1 second for example). Subsequently, the control unit 1000 controls the motor driver 310 so that the transporting roller (lower roller) 70 is rotated again in the direction of ejecting the disc 11 for a predetermined time. Under this control, the transporting roller (lower roller) 70 rotates in the non-ejecting direction for a predetermined time, and then rotates in the direction of ejecting the disc 11. Then, upon detection, from outputs made by the sensors 820, 821, that the disc 11 has been ejected, the control unit 1000 controls the motor driver 320 to stop the drive motor 300, bringing the drive motor 300 to come to a stop.

As described, by providing control in such a way that the drive motor 300 is turned in the ejecting direction, then in the loading direction, and finally in the ejecting direction, it becomes possible to prevent troubles such as the disc 11 being caught on e.g. the turntable 14 in the apparatus, becoming unable to eject.

Preferably, when the drive motor 300 is driven in the reverse direction, the drive motor 300 should be stopped for a predetermined time (0.05 second for example) before turned in the reverse direction. This protects each of the gears in the apparatus from being subjected to an excessive force from a sudden change in rotating directions.

INDUSTRIAL APPLICABILITY

The present invention is for application to car audio systems, portable audio apparatuses, etc., and is particularly suitable for DVD player apparatuses, CD player apparatuses, etc. installed in automobiles.

The invention claimed is:

1. A disc player apparatus comprising a transporting roller and a disc guide roller for transportation and ejection of a disc by holding the disc therebetween and rotating the transporting roller, the disc player apparatus further comprising:
    first supporting member for supporting the transporting roller rockably with respect to a main body;
    second supporting member for supporting the disc guide roller rockably with respect to the main body;
    a first guide member for engagement with the first supporting member to move the transporting roller toward the disc when transporting and ejecting the disc and to move the transporting roller to a turnabout position when recording on or replaying from the disc;
    a second guide member for contact with the second supporting member to move the disc guide roller toward the disc when transporting and ejecting the disc and to move the disc guide roller to a turnabout position when recording on or replaying from the disc;
    an upper case attached to the main body; and
    a flat spring attached to the upper case for urging the disc guide roller,
    wherein the flat spring is provided with a spring piece for contact with the disc guide roller at a disc guide roller turnabout position.

2. The disc player apparatus according to claim 1, wherein the disc guide roller is urged by the flat spring via the second supporting member.

3. The disc player apparatus according to claim 1, further comprising driving means for driving the transporting roller, and controlling means for controlling the driving means, wherein the controlling means controls the driving means in such a way that the transporting roller is rotated in a disc ejecting direction for a predetermined time after the disc is held between the transporting roller and the disc guide roller, then rotated in a disc transporting direction for a predetermined time, and then rotated in the disc ejecting direction, when the disc is ejected.

4. The disc player apparatus according to claim 3, wherein the controlling means controls the driving means in such a way that rotation of the transporting roller is stopped for a predetermined time when direction of rotation of the transporting roller is switched from the disc ejecting direction to the disc transporting direction or from the disc transporting direction to the disc ejecting direction.

* * * * *